(12) United States Patent
Miyauchi et al.

(10) Patent No.: US 12,347,845 B2
(45) Date of Patent: Jul. 1, 2025

(54) POWER STORAGE DEVICE INCLUDING NEGATIVE ELECTRODE HAVING END REGION FOR REDUCING LITHIUM PRECIPITATION NOT FACING POSITIVE ELECTRODE

(71) Applicant: Musashi Energy Solutions Co., Ltd., Hokuto (JP)

(72) Inventors: Hiroyuki Miyauchi, Minato-ku (JP); Nobuo Ando, Minato-ku (JP)

(73) Assignee: Musashi Energy Solutions Co., Ltd., Hokuto (JP)

( * ) Notice: Subject to any disclaimer, the term of this patent is extended or adjusted under 35 U.S.C. 154(b) by 700 days.

(21) Appl. No.: 17/616,012

(22) PCT Filed: Feb. 26, 2020

(86) PCT No.: PCT/JP2020/007734
§ 371 (c)(1),
(2) Date: Dec. 2, 2021

(87) PCT Pub. No.: WO2020/246081
PCT Pub. Date: Dec. 10, 2020

(65) Prior Publication Data
US 2022/0320482 A1    Oct. 6, 2022

(30) Foreign Application Priority Data

Jun. 3, 2019 (JP) ................. 2019-103671

(51) Int. Cl.
*H01M 4/133* (2010.01)
*H01G 11/28* (2013.01)
(Continued)

(52) U.S. Cl.
CPC ............ *H01M 4/133* (2013.01); *H01G 11/28* (2013.01); *H01G 11/32* (2013.01); *H01G 11/50* (2013.01);
(Continued)

(58) Field of Classification Search
CPC ........ H01M 4/133; H01M 4/13; H01M 4/483; H01M 4/587; H01M 10/0525; H01G 11/28; H01G 11/32; H01G 11/50
(Continued)

(56) References Cited

U.S. PATENT DOCUMENTS

2009/0097189 A1    4/2009  Tasaki et al.
2017/0256822 A1    9/2017  Onoda
(Continued)

FOREIGN PATENT DOCUMENTS

CN    109088091 A    12/2018
EP    1 930 919 A1    6/2008
(Continued)

OTHER PUBLICATIONS

Office Action issued on Apr. 4, 2023 in the corresponding Japanese Patent Application No. 2021-524669 (with machine-generated English Translation) therein, 4 pages.
(Continued)

*Primary Examiner* — Sean P Cullen
(74) *Attorney, Agent, or Firm* — Oblon, McClelland, Maier & Neustadt, L.L.P.

(57) ABSTRACT

A power storage device may include an electrode assembly including a positive electrode, a separator, and a negative electrode, and an electrolyte solution. The negative electrode comprises a negative electrode current collector and a negative electrode active material layer. The active material layer comprises a surplus region A not facing the positive electrode active material layer, an end region B facing a region
(Continued)

in the positive electrode active material layer, the region extending from an end of the positive electrode active material layer toward a center of the positive electrode active material layer by a length of 5% of a length from the center to the end, and a center region C. A negative electrode potential VA and a negative electrode potential VC after the positive electrode and the negative electrode are short-circuited satisfy: (1) VA≤2.0 V; (2) VC≤1.0 V; and (3) VA/VC≥0.7.

9 Claims, 4 Drawing Sheets

(51) Int. Cl.
*H01G 11/32* (2013.01)
*H01G 11/50* (2013.01)
*H01M 4/02* (2006.01)
*H01M 4/13* (2010.01)
*H01M 4/48* (2010.01)
*H01M 4/587* (2010.01)
*H01M 10/0525* (2010.01)

(52) U.S. Cl.
CPC ............. *H01M 4/13* (2013.01); *H01M 4/483* (2013.01); *H01M 4/587* (2013.01); *H01M 10/0525* (2013.01); *H01M 2004/021* (2013.01); *H01M 2004/027* (2013.01)

(58) Field of Classification Search
USPC ................................. 429/209, 231.4, 231.95
See application file for complete search history.

(56) References Cited

U.S. PATENT DOCUMENTS

| | | |
|---|---|---|
| 2018/0366786 A1 | 12/2018 | Fujii |
| 2019/0051897 A1 | 2/2019 | Kamo et al. |
| 2019/0280337 A1 | 9/2019 | Narita et al. |
| 2020/0219669 A1 | 7/2020 | Doi et al. |
| 2021/0257669 A1 | 8/2021 | Narita et al. |

FOREIGN PATENT DOCUMENTS

| | | | |
|---|---|---|---|
| EP | 3 407 409 A1 | | 11/2018 |
| JP | 7-235330 A | | 9/1995 |
| JP | 9-293499 A | | 11/1997 |
| JP | 2004-266091 A | | 9/2004 |
| JP | 2007-67105 A | | 3/2007 |
| JP | 2007329077 A | * | 12/2007 |
| JP | 2012-69894 A | | 4/2012 |
| JP | 2018-6289 A | | 1/2018 |
| JP | 2019-3789 A | | 1/2019 |
| JP | 2019021391 A | * | 2/2019 |
| JP | 2019021393 A | * | 2/2019 |
| WO | WO 2016/034936 A1 | | 3/2016 |
| WO | WO 2018/100470 A1 | | 6/2018 |
| WO | WO 2019/017390 A1 | | 1/2019 |

OTHER PUBLICATIONS

Extended European Search Report issued on Jul. 3, 2023 in the corresponding European Application No. 20817719.6, 13 pages.
Combined Chinese Office Action and Search Report issued Jun. 21, 2023, in corresponding Chinese Patent Application No. 202080041461.7 (with English Translation and English Translation of Category of Cited Documents), 20 pages.
International Search Report issued on May 26, 2020 in PCT/JP2020/007734 filed on Feb. 26, 2020, 5 pages.
Written Opinion issued on May 26, 2020 in PCT/JP2020/007734 filed on Feb. 26, 2020, 3 pages.
Office Action issued Feb. 25, 2025, in corresponding Korean Patent Application No. 10-2021-7042050 (with English-language Translation) 18 pages.

* cited by examiner

POWER STORAGE DEVICE INCLUDING NEGATIVE ELECTRODE HAVING END REGION FOR REDUCING LITHIUM PRECIPITATION NOT FACING POSITIVE ELECTRODE

CROSS-REFERENCE TO RELATED APPLICATION

This application is the national stage of international application PCT/JP2020/007734, filed on Feb. 26, 2024, and claims the benefit of Japanese Patent Application No. 2019-103671, filed on Jun. 3, 2019, with the Japan Patent Office. The entire disclosure of Japanese Patent Application No. 2019-103671 is incorporated herein by reference

TECHNICAL FIELD

The present disclosure relates to a power storage device and a method for manufacturing a lithium ion rechargeable battery.

BACKGROUND ART

Electronic devices have been remarkably downsized and light-weighted in recent years. As a result of the downsizing and light-weighting of the electronic devices, there are further increasing demands for also downsizing and light-weighting batteries used as power sources to drive the electronic devices.

In order to satisfy the demands for downsizing and light-weighting the batteries, non-aqueous electrolyte rechargeable battery has been developed. An example of the non-aqueous electrolyte rechargeable battery is a lithium ion rechargeable battery. Further, lithium ion capacitors have been known as power storage devices adapted for applications that require high energy density characteristics and high output characteristics. In addition, sodium ion batteries and capacitors have been known. Sodium is lower in cost and richer in resources than lithium.

In such batteries and capacitors, a process of doping an electrode active material with alkali metal in advance has been adopted for various purposes. The process of doping the electrode active material with alkali metal in advance is referred to as pre-doping.

For example, in a lithium ion capacitor, lithium pre-doping is performed for the purpose of reducing a negative electrode potential and increasing an energy density. A method of pre-doping in this case is mainly to pre-dope the negative electrode active material in a cell using a current collector having through-holes. This method is disclosed, for example, in Patent Document 1.

Further, in the lithium ion rechargeable battery, pre-doping is performed for the purpose of reducing irreversible capacity of the negative electrode. In this case, a method of pre-doping other than the above is known in which the negative electrode active material is pre-doped in advance of assembling the battery. This method is disclosed, for example, in Patent Documents 2 and 3. Furthermore, a method to pre-dope a negative electrode with sodium in advance of assembling a power storage device is also adopted in the manufacture of a sodium-ion-type power storage device. This method is disclosed, for example, in Patent Document 4.

PRIOR ART DOCUMENTS

Patent Documents

Patent Document 1: Japanese Unexamined Patent Application Publication No. 2007-67105
Patent Document 2: Japanese Unexamined Patent Application Publication No. H07-235330
Patent Document 3: Japanese Unexamined Patent Application Publication No. H09-293499
Patent Document 4: Japanese Unexamined Patent Application Publication No. 2012-69894

SUMMARY OF THE INVENTION

Problems to be Solved by the Invention

There is ample electrolyte solution around the edge of the negative electrode. Thus, an electric current is easily concentrated around the edge of the negative electrode. In addition, lithium is easily precipitated from the edge of the negative electrode. The precipitation of lithium from the negative electrode may cause various problems. On the other hand, if the edge of the negative electrode is not pre-doped, effects of pre-doping are not sufficiently obtained and the characteristics of the power storage device may be degraded.

In one aspect of the present disclosure, it is desirable to provide a power storage device that can inhibit the precipitation of lithium from the negative electrode and that has excellent characteristics, and a method for manufacturing a lithium ion rechargeable battery.

Means for Solving the Problems

One aspect of the present disclosure is to provide a power storage device comprising: an electrode assembly comprising a positive electrode, a separator, and a negative electrode; and an electrolyte solution, wherein the negative electrode is doped with lithium, wherein the negative electrode comprises a negative electrode current collector and a negative electrode active material layer formed on a surface of the negative electrode current collector, wherein the positive electrode comprises a positive electrode current collector and a positive electrode active material layer formed on a surface of the positive electrode current collector, wherein the negative electrode active material layer comprises a surplus region A not facing the positive electrode active material layer, an end region B facing a region in the positive electrode active material layer, the region extending from an end of the positive electrode active material layer toward a center of the positive electrode active material layer by a length of 5% of a length from the center to the end, and a center region C other than the surplus region A and the end region B, and wherein a negative electrode potential VA of the surplus region A after the positive electrode and the negative electrode are short-circuited, and a negative electrode potential VC of the center region C after the positive electrode and the negative electrode are short-circuited satisfy Formulas (1) to (3) below.

$$VA \leq 2.0 \text{ V} \qquad \text{Formula (1)}$$

$$VC \leq 1.0 \text{ V} \qquad \text{Formula (2)}$$

$$VA/VC \geq 0.7 \qquad \text{Formula (3)}$$

The power storage device in one aspect of the present disclosure can inhibit the precipitation of lithium from the negative electrode, and has excellent characteristics.

Another aspect of the present disclosure is to provide a power storage device comprising: an electrode assembly comprising a positive electrode, a separator, and a negative electrode; and an electrolyte solution, wherein the negative electrode is doped with lithium, wherein the negative electrode comprises a negative electrode current collector and a negative electrode active material layer formed on a surface of the negative electrode current collector, wherein the positive electrode comprises a positive electrode current collector and a positive electrode active material layer formed on a surface of the positive electrode current collector, wherein the negative electrode active material layer comprises a surplus region A not facing the positive electrode active material layer, an end region B facing a region in the positive electrode active material layer, the region extending from an end of the positive electrode active material layer toward a center of the positive electrode active material layer by a length of 5% of a length from the center to the end, and a center region C other than the surplus region A and the end region B, and wherein in a case where the power storage device is disassembled in a charged state and a discharge capacity QA of the surplus region A and a discharge capacity QC of the center region C are measured, Formula (4) below is satisfied.

$$0<QA<QC \quad \text{Formula (4)}$$

The power storage device in another aspect of the present disclosure can inhibit the precipitation of lithium from the negative electrode, and has excellent characteristics.

Another aspect of the present disclosure is to provide an electrode assembly comprising a positive electrode, a separator, and a negative electrode; and an electrolyte solution, wherein the negative electrode is doped with lithium, wherein the negative electrode comprises a negative electrode current collector and a negative electrode active material layer formed on a surface of the negative electrode current collector, wherein the positive electrode comprises a positive electrode current collector and a positive electrode active material layer formed on a surface of the positive electrode current collector, wherein the negative electrode active material layer comprises a surplus region A not facing the positive electrode active material layer, an end region B facing a region in the positive electrode active material layer, the region extending from an end of the positive electrode active material layer toward a center of the positive electrode active material layer by a length of 5% of a length from the center to the end, and a center region C other than the surplus region A and the end region B, wherein in a case where the power storage device is disassembled in a charged state and a discharge capacity QA of the surplus region A, a discharge capacity QB of the end region B, and a discharge capacity QC of the center region C are measured, Formula (7) and Formula (9) below are satisfied.

$$0.7 \leq QB/QC \leq 0.99 \quad \text{Formula (7)}$$

$$QA/QC \leq 0.1 \quad \text{Formula (9)}$$

The power storage device in another aspect of the present disclosure can inhibit the precipitation of lithium from the negative electrode, and has excellent characteristics.

Another aspect of the present disclosure is to provide a method for manufacturing a lithium ion rechargeable battery comprising an electrode cell, the method comprising: doping a negative electrode with lithium, the negative electrode comprising a negative electrode current collector and a negative electrode active material layer formed on a surface of the negative electrode current collector; and sequentially stacking the negative electrode doped with lithium, a separator, and a positive electrode comprising a positive electrode active material layer to form the electrode cell, wherein the negative electrode active material layer comprises a surplus region A not facing the positive electrode active material layer, an end region B facing a region in the positive electrode active material layer, the region extending from an end of the positive electrode active material layer toward a center of the positive electrode active material layer by a length of 5% of a length from the center to the end, and a center region C other than the surplus region A and the end region B, and wherein a negative electrode potential VA of the surplus region A after the positive electrode and the negative electrode are short-circuited, and a negative electrode potential VC of the center region C after the positive electrode and the negative electrode are short-circuited satisfy Formulas (1) to (3) below.

$$VA \leq 2.0 \text{ V} \quad \text{Formula (1)}$$

$$VC \leq 1.0 \text{ V} \quad \text{Formula (2)}$$

$$VA/VC \geq 0.7 \quad \text{Formula (3)}$$

According to the method for manufacturing the lithium ion rechargeable battery in another aspect of the present disclosure, it is possible to manufacture a lithium ion rechargeable battery that can inhibit the precipitation of lithium from the negative electrode and that has excellent characteristics.

Another aspect of the present disclosure is to provide a method for manufacturing a lithium ion rechargeable battery comprising an electrode cell, the method comprising: doping a negative electrode with lithium, the negative electrode comprising a negative electrode current collector and a negative electrode active material layer formed on a surface of the negative electrode current collector; and sequentially stacking the negative electrode doped with lithium, a separator, and a positive electrode comprising a positive electrode active material layer to form the electrode cell, wherein the negative electrode active material layer comprises a surplus region A not facing the positive electrode active material layer, an end region B facing a region in the positive electrode active material layer, the region extending from an end of the positive electrode active material layer toward a center of the positive electrode active material layer by a length of 5% of a length from the center to the end, and a center region C other than the surplus region A and the end region B, and wherein in a case where the power storage device is disassembled in a charged state and a discharge capacity QA of the surplus region A and a discharge capacity QC of the center region C are measured, Formula (4) below is satisfied.

$$0<QA<QC \quad \text{Formula (4)}$$

According to the method for manufacturing the lithium ion rechargeable battery in another aspect of the present disclosure, it is possible to manufacture a lithium ion rechargeable battery that can inhibit the precipitation of lithium from the negative electrode and that has excellent characteristics.

Another aspect of the present disclosure is to provide a method for manufacturing a lithium ion rechargeable battery comprising an electrode cell, the method comprising: doping a negative electrode with lithium, the negative electrode comprising a negative electrode current collector and a negative electrode active material layer formed on a surface of the negative electrode current collector; and sequentially stacking the negative electrode doped with lithium, a separator, and a positive electrode comprising a positive electrode active material layer to form the electrode cell, wherein the negative electrode active material layer comprises a surplus region A not facing the positive electrode active material layer, an end region B facing a region in the positive electrode active material layer, the region extending from an end of the positive electrode active material layer toward a center of the positive electrode active material layer by a length of 5% of a length from the center to the end, and a center region C other than the surplus region A and the end region B, and wherein in a case where the power storage device is disassembled in a charged state and a discharge capacity QA of the surplus region A, a discharge capacity QB of the end region B, and a discharge capacity QC of the center region C are measured, Formula (7) and Formula (9) indicated below are satisfied.

$$0.7 \leq QB/QC \leq 0.99 \quad \text{Formula (7)}$$

$$QA/QC \leq 0.1 \quad \text{Formula (9)}$$

According to the method for manufacturing the lithium ion rechargeable battery in another aspect of the present disclosure, it is possible to manufacture a lithium ion rechargeable battery that can inhibit the precipitation of lithium from the negative electrode and that has excellent characteristics.

EXPLANATION OF REFERENCE NUMERALS

Figure 1:
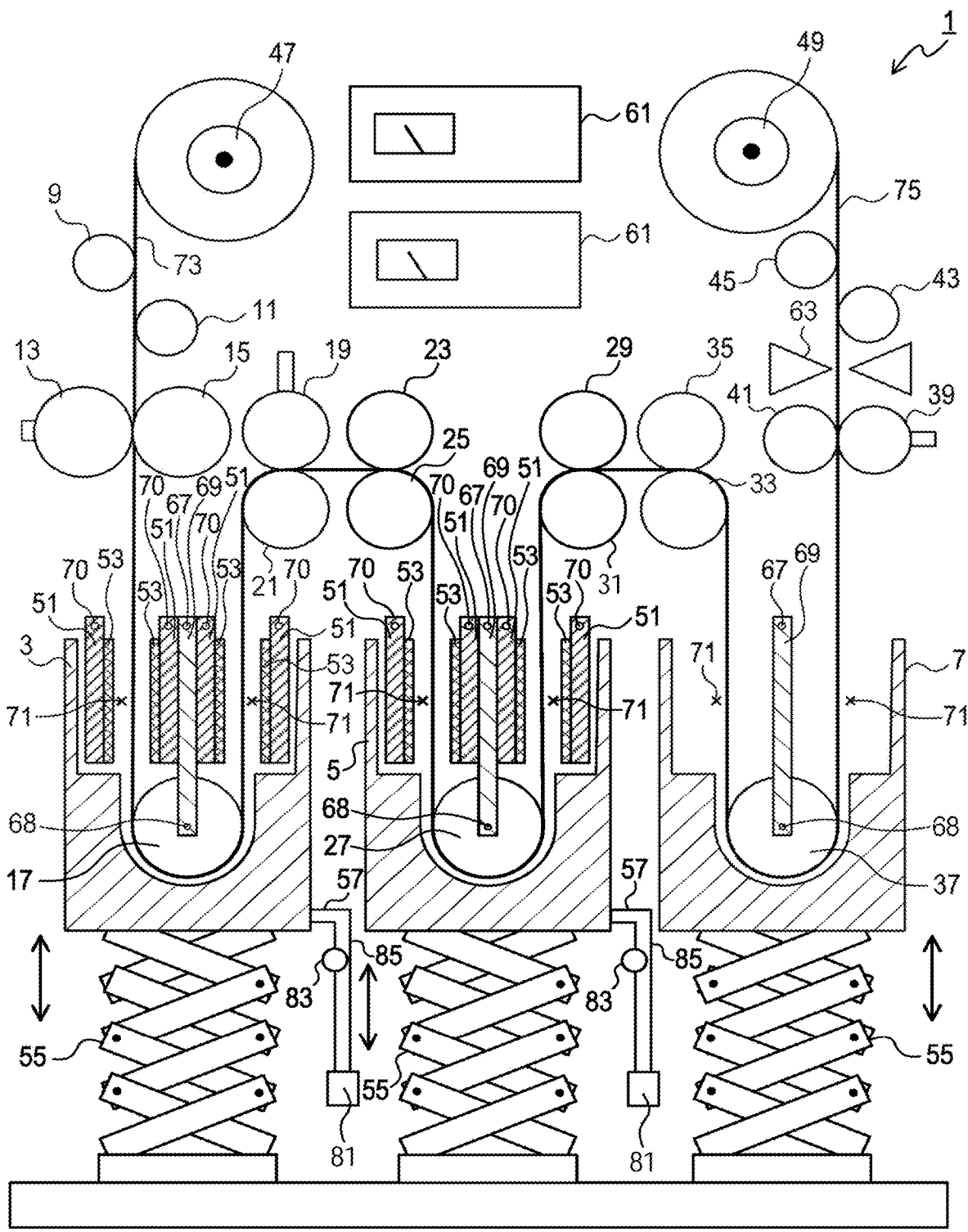
FIG. 1 is an explanatory diagram showing a configuration of an electrode manufacturing apparatus.

1 . . . electrode manufacturing apparatus, 3, 5 . . . electrolyte solution tank, 7 . . . cleaning tank, 9, 11, 13, 15, 17, 19, 21, 23, 25, 27, 29, 31, 33, 35, 37, 39, 41, 43, 45 . . . conveyor roller, 47 . . . supply roll, 49 . . . wind-up roll, 51 . . . counter electrode member, 53 . . . porous insulating member, 55 . . . supporting table, 57 . . . circulation filter, 61 . . . direct current power source, 63 . . . blower, 67, 68 . . . supporting rod, 69 . . . partition plate, 70 . . . supporting rod, 71 . . . space, 73 . . . electrode precursor, 75 . . . power storage device negative electrode, 79 . . . alkali metal containing plate, 81 . . . filter, 83 . . . pump, 85 . . . piping, 93 . . . negative electrode current collector, 95 . . . negative electrode active material layer, 99 . . . positive electrode active material layer, 108 . . . mask, 109 . . . exposed portion

MODE FOR CARRYING OUT THE INVENTION

Example embodiments of the present disclosure will be described with reference to the drawings.

1. POWER STORAGE DEVICE (1-1) Overall Structure of Power Storage Device

A power storage device according to the present disclosure comprises an electrode assembly and an electrolyte solution. The electrode assembly comprises a positive electrode, a separator, and a negative electrode. The negative electrode comprises a negative electrode current collector and a negative electrode active material layer. The negative electrode active material layer is formed on the surface of the negative electrode current collector. The negative electrode is doped with lithium.

In the present specification, "positive electrode" means an electrode disposed on a side from which an electric current flows out during discharging, and into which an electric current flows during charging. In the present specification, "negative electrode" means an electrode disposed on a side into which an electric current flows during discharging, and from which an electric current flows out during charging. In the present specification, a negative electrode potential after the positive electrode and the negative electrode are short-circuited is a negative electrode potential obtained by the following method. Specifically, the power storage device undergoes a constant current discharge in a charge/discharge tester for at least 12 hours until the voltage becomes 0 V, then left for at least 12 hours while a positive electrode terminal and a negative electrode terminal are electrically short-circuited, and then the short-circuit is released and a value is measured within 0.5 to 1.5 hours after the short-circuit is released.

In the present specification, "doped with lithium" means a state in which lithium is occluded, intercalated, adsorbed, carried, alloyed, or inserted in various types of state, such as a metallic state, an ionic state, a state of compound. Examples of being "doped" include a phenomenon in which at least one of lithium and anions enter a positive electrode active material, and a phenomenon in which lithium ions enter the negative electrode active material. "Dedoping" means desorption and release. Examples of "dedoping" include a phenomenon in which lithium ions or anions are desorbed from the positive electrode active material, and a phenomenon in which lithium ions are desorbed from the negative electrode active material.

In the power storage device according to the present disclosure, it is preferable that at least one of the negative electrode and the positive electrode is doped with lithium in advance. In the power storage device according to the present disclosure, it is more preferable that the negative electrode is doped with lithium in advance.

Examples of a method for doping at least one of the negative electrode and the positive electrode with lithium in advance may include a method to electrically connect at least one of the negative electrode and the positive electrode with a lithium electrode in an electrode manufacturing apparatus. The lithium electrode includes metal lithium.

The power storage device according to the present disclosure can be manufactured as follows, for example. The positive electrode is manufactured by forming a positive electrode active material layer on the surface of a positive electrode current collector. The negative electrode is manufactured by forming a negative electrode active material layer on the surface of a negative electrode current collector. The negative electrode is doped with lithium ions. In order to dope the negative electrode with lithium ions, a doping unit can be used, for example. The doping unit comprises, for example, a doping tank, a conveyer assembly, a counter electrode member, a connector, and a porous insulating member. An electrode manufacturing apparatus 1, which will be described below, corresponds to the doping unit. Electrolyte solution tanks 3, 5, which will be described below, correspond to the doping tank.

The doping tank stores a solution containing lithium ions. The conveyer assembly conveys an electrode precursor along a path that runs through the doping tank. The counter electrode member is accommodated in the doping tank. The connector electrically connects the electrode precursor and the counter electrode member with each other. The porous insulating member is arranged between the electrode precursor and the counter electrode member. The porous insulating member is not in contact with the electrode precursor.

Subsequently, the positive electrode, a first separator, the negative electrode, and a second separator are sequentially stacked to form a laminate. The laminate is, for example, three or more stacked units, each of which includes the positive electrode, the first separator, the negative electrode, and the second separator. Example forms of the laminate may include a plate, a sheet, and a wound-form. The laminate corresponds to the electrode assembly.

Subsequently, the electrode assembly is sealed in an outer container. The outer container is in the form of, for example, a square, a cylinder, and a laminate. The outer container may be a film or a can. Then, the outer container is filled with an electrolyte solution. Through the above processes, the power storage device is completed.

A lithium doping ratio is preferably 5% or more and 95% or less relative to discharge capacity C2 of the negative electrode, more preferably 10% or more and 70% or less, further more preferably 15% or more and 50% or less. The lithium doping ratio is a ratio of an amount of lithium doped in the negative electrode active material layer relative to the discharge capacity C2 of the negative electrode. The amount of lithium doped in the negative electrode active material layer is a value obtained by dividing capacity of an electric current used in lithium doping by mass of a negative electrode active material. The doping amount of lithium in the negative electrode active material layer is expressed in a unit of mAh/g.

The discharge capacity C2 of the negative electrode is a value obtained by dividing discharge capacity of the negative electrode when the negative electrode is charged and discharged between 0 V vs. Li/Li+ and 3 V vs. Li/Li+ by the mass of the negative electrode active material contained in the negative electrode active material layer. If the lithium doping ratio is 5% or more and 95% or less relative to the discharge capacity C2 of the negative electrode, a cycle durability of the power storage device further improves.

The power storage device of the present disclosure may have a configuration basically similar to, for example, a power storage device described in JP 2004-266091A.

(1-2) Specific Examples of Power Storage Device

Specific examples of the power storage device according to the present disclosure may include a lithium ion capacitor and a lithium ion rechargeable battery. In the present specification, the lithium ion rechargeable battery means a power storage device in which the positive electrode and the negative electrode are non-polarizable electrodes and lithium ions are contained.

(1-3) Current Collector

In the present specification, "current collector" means both of the positive electrode current collector and the negative electrode current collector. The positive electrode comprises the positive electrode current collector that receives and distributes electricity. The negative electrode comprises the negative electrode current collector that receives and distributes electricity.

(1-4) Positive Electrode Current Collector

Examples of a material for the positive electrode current collector may include aluminum and stainless steel. The material for the positive electrode current collector is preferably aluminum. The thickness of the positive electrode current collector is not particularly limited, but preferably in the rage of 1 μm to 50 μm, more preferably in the rage of 5 μm to 40 μm, and particularly preferably in the rage of 10 μm to 40 μm.

The positive electrode current collector has an aperture ratio (hereinafter referred to as positive electrode current collector aperture ratio) of preferably 0% or more and 0.1% or less, and more preferably 0%. Here, the positive electrode current collector aperture ratio can be obtained by Formula (10) below.

$$\text{positive electrode current collector aperture ratio (\%)} = [1-(\text{mass of positive electrode current collector/absolute specific gravity of positive electrode current collector})/(\text{apparent volume of positive electrode current collector})] \times 100 \quad \text{Formula (10)}$$

In the Formula (10), "absolute specific gravity of positive electrode current collector" is mass per unit volume of the positive electrode current collector based on an assumption that the positive electrode current collector is not perforated. "Apparent volume of positive electrode current collector" is a volume of the positive electrode current collector based on an assumption that the positive electrode current collector is not perforated. "Apparent volume of positive electrode current collector" is a volume obtained by measuring the vertical dimension, the lateral dimension and the thickness dimension of the positive electrode current collector, and by calculation based on the measured values. The aperture ratio of the positive electrode current collector of 0% or more and 0.1% or less facilitates coating of the positive electrode current collector with the positive electrode active material layer.

(1-5) Positive Electrode Active Material

For the positive electrode active material, a substance that enables reversible doping and dedoping with lithium is used. Examples of the positive electrode active material may include lithium cobalt oxide and activated carbon. The specific surface area of the lithium cobalt oxide is preferably from 0.1 m²/g to 30 m²/g. The activated carbon preferably has 50% volume cumulative diameter (D50) of 3 μm to 30 μm from the aspect of the filling density of the activated carbon. If the specific surface area and the 50% volume cumulative diameter (D50) of the activated carbon are within the above range, the energy density of the power storage device further improves. Here, the value of the 50% volume cumulative diameter (D50) is a value obtained by a micro-track method.

It is preferable to select the positive electrode active material so that the obtained positive electrode is chargeable or dischargeable within a region of 3 V or more. The description of "chargeable or dischargeable within a region of 3 V" means that when a cyclic voltammetry measurement is made in the region of 3 V or more at a sweep rate of 0.1 mV/min in a tripolar cell in which the positive electrode is used as a working electrode and metal lithium is used for a counter electrode and a reference electrode, an oxidation current and a reduction current are confirmed in the region of 3 V or more, and a ratio of an area of the reduction current to an area of the oxidation current is 0.5 or more, and a capacity calculated from the area of the reduction current is 50 mAh/g or more.

The area of the oxidation current is an area of a region surrounded by an axis showing the electric current value of 0 (zero) A and an oxidation wave. The area of the reduction current is an area of a region surrounded by the axis showing the electric current value of 0 A and a reduction wave. The ratio of the area of the reduction current to the area of the oxidation current in general is 2.0 or less. The capacity calculated from the area of the reduction current in general is 1000 mAh/g or less.

Examples of the positive electrode active material to obtain the positive electrode that is chargeable and dischargeable in the rage of the region of 3 V or more may include transition metal oxide and an inorganic acid based compound. Examples of the transition metal oxide may include cobalt oxide such as lithium cobalt oxide, nickel oxide such as lithium nickel oxide, manganese oxide such as lithium manganese oxide, vanadium oxides such as lithium vanadium oxide, and transition metal oxide containing lithium such as ternary transition oxide of nickel-cobalt-manganese and ternary transition oxide of nickel-cobalt-aluminum. Examples of the inorganic acid based compound may include a phosphoric acid based compound such as lithium iron phosphate and lithium iron pyrophosphate.

(1-6) Positive Electrode Active Material Layer

The positive electrode active material layer is formed by attaching the positive electrode active material to the positive electrode current collector. Examples of a method of attaching the positive electrode active material may include coating, printing, injecting, spraying, vapor deposition, and pressure bonding.

The positive electrode active material layer has a thickness of preferably 10 μm to 200 μm, more preferably 25 μm to 100 μm, and particularly preferably 50 μm to 100 μm.

If the positive electrode active material layer is formed on each side of the positive electrode, the thickness of the positive electrode active material layer means an average thickness per one side, obtained by multiplying a total thickness of the positive electrode active material layers formed on both sides of the positive electrode by ½. If the positive electrode active material layer is formed on only one side of the positive electrode, the thickness of the positive electrode active material layer means a thickness of the positive electrode active material layer formed on the one side of the positive electrode. The thickness of the positive electrode active material layer is a thickness after the positive electrode active material layer is roll-pressed.

If the thickness of the positive electrode active material layer is within the above-described ranges, a diffusion resistance of the ions moving through the positive electrode active material layer becomes small. Thus, the internal resistance of the power storage device decreases. Moreover, if the thickness of the positive electrode active material layer is within the above ranges, the capacity of the positive electrode can be increased, thus increasing the cell capacity. Consequently, the capacity of the power storage device increases.

The roll-pressed positive electrode active material layer may preferably have an electrode density of 0.1 g/cm$^3$ to 5 g/cm$^3$, more preferably 1 g/cm$^3$ to 4.5 g/cm$^3$, and particularly preferably 2 g/cm$^3$ to 4 g/cm$^3$. If the electrode density of the positive electrode active material layer is within a range from the above-described lower limit or more to the above-described upper limit or less, the energy density of the power storage device increases and the cycle characteristics of the power storage device improves.

The electrode density of the positive electrode active material layer can be measured by the following method. The power storage device is disassembled to obtain the positive electrode. The obtained positive electrode undergoes a cleaning process with diethyl carbonate and is vacuum dried at 100° C. The mass of the positive electrode active material layer and the external volume of the positive electrode active material are measured. The mass of the positive electrode active material layer is divided by the external volume of the positive electrode active material layer to obtain the electrode density of the positive electrode active material layer. "The external volume of the positive electrode active material layer" is a volume obtained by measuring the vertical dimension, the lateral dimension, and the thickness dimension of the positive electrode active material layer, and by calculation based on the measured values.

Examples of the method to achieve the electrode density within the above ranges may include a method to roll-press the positive electrode active material layer.

The positive electrode active material layer may have a coating weight of preferably 10 g/m$^2$ to 500 g/m$^2$, and more preferably 20 g/m$^2$ to 250 g/m$^2$. If the positive electrode active material layer is formed on each side of the positive electrode, the coating weight of the positive electrode active material layer means an average coating weight per one side, obtained by multiplying a total coating weight of the positive electrode active material layers formed on both sides of the positive electrode by ½. If the positive electrode active material layer is formed on only one side of the positive electrode, the coating weight of the positive electrode active material layer means the coating weight of the positive electrode active material layer formed on the one side of the positive electrode.

If the coating weight of the positive electrode active material layer is within the above-described ranges, the energy density of the power storage device increases and the cycle characteristics of the power storage device improves.

The coating weight of the positive electrode active material layer can be measured by the following method. The power storage device is disassembled to obtain the positive electrode. The obtained positive electrode undergoes a cleaning process with diethyl carbonate and is dried at 100° C. The positive electrode was punched to obtain a measurement sample having a specified area, and the mass of the measurement sample is measured. Subsequently, in the measurement sample, the positive electrode active material layer is peeled off from the positive electrode current collector and the mass of the remaining positive electrode current collector is measured. The mass of the remaining the positive electrode current collector is subtracted from the mass of the measurement sample to obtain the mass of the positive electrode active material layer. The mass of the positive electrode active material layer is divided by the area of the measurement sample to calculate the coating weight of the positive electrode active material layer.

(1-7) Negative Electrode Current Collector

For the negative electrode current collector, stainless steel, copper, nickel, and so on can he used. The thickness of the negative electrode current collector is not particularly limited. The thickness of the negative electrode current collector in general is from 1 μm to 50 μm, and particularly preferably from 5 μm to 20 μm.

The negative electrode current collector has an aperture ratio (hereinafter referred to as a negative electrode current collector aperture ratio) of preferably 0% or more and 0.1% or less. The negative electrode current collector aperture ratio is preferably 0% or more and 0.05% or less, and more preferably 0%. If the negative electrode current collector does not have a through-hole, the negative electrode current collector aperture ratio is 0%. Here, the negative electrode current collector aperture ratio can be obtained by Formula (11) below.

$$\text{Negative electrode current collector aperture ratio (\%)}=[1-(\text{mass of negative electrode current collector/absolute specific gravity of negative electrode current collector})/(\text{apparent volume of negative electrode current collector})]\times 100 \quad \text{Formula (11)}$$

In the Formula (11), "absolute specific gravity of negative electrode current collector" is mass per unit volume of the negative electrode current collector based on an assumption that the negative electrode current collector is not perforated. "Apparent volume of negative electrode current collector" is a volume of the negative electrode current collector based on an assumption that the negative electrode current collector is not perforated. "Apparent volume of negative electrode current collector" is a volume obtained by measuring the vertical dimension, the lateral dimension and the thickness dimension of the negative electrode current collector, and by calculation based on the measured values.

The negative electrode current collector aperture ratio preferably has an upper limit of 0.05%, particularly preferably 0%. If the negative electrode current collector aperture ratio is the above-described upper limit or less, the negative electrode current collector can maintain its electrode strength even if the thickness of the negative electrode current collector is thin. Consequently, the negative electrode current collector is inhibited from being broken during manufacturing of the electrode and a cell. Furthermore, if the negative electrode current collector aperture ratio is the above-described upper limit or less, resistance of the negative electrode can be reduced.

(1-8) Negative Electrode Active Material

For the negative electrode active material, a substance that allows reversible doping and dedoping with lithium can be used. Examples of the negative electrode active material may include a silicon-based material and a carbon-based material. Examples of the silicon-based material may include Si, SiO, and SiOC. Examples of the carbon-based material may include a graphite-based particle, a hard carbon-based particle, a soft carbon-based particle, and a polyacene-based organic semiconductor (PAS). Examples of the graphite-based particle may include a graphite-based composite particle and a polyacene-based organic semiconductor (PAS).

The graphite-based particle, the hard carbon-based particle, and the soft carbon-based particle include composite particles respectively containing graphite, hard carbon (hardly graphitizable carbon), and soft carbon (easily-graphitizable carbon) as main components. Examples of the composite particle may include a composite particle comprising a core particle mainly composed of one of the above substances and a graphitized substance covering the surface of the core particle. Examples of the graphitized substance may include graphitized substances derived from tar or pitch.

The 50% volume cumulative diameter (D50) of each of the graphite-based particle, the hard carbon-based particle, and the soft carbon-based particle is preferably within a range of 1.0 μm to 35 μm, and more preferably within a range of 2 μm to 30 μm. If the 50% volume cumulative diameter (D50) of each of the graphite-based particle, the hard carbon-based particle, and the soft carbon-based particle is 1.0 μm or more, the graphite-based particle can be easily manufactured. If the 50% volume cumulative diameter (D50) of each of the graphite-based particle, the hard carbon-based particle, and the soft carbon-based particle is 1.0 μm or more, gas is less likely to be generated during charging. As a result, durability of the power storage device improves. The 50% volume cumulative diameter (D50) of each of the graphite-based particle, the hard carbon-based particle, and the soft carbon-based particle is a value obtained by the micro-track method.

The polyacene-based organic semiconductor is a heat treated product of an aromatic condensation polymer. The polyacene-based organic semiconductor includes a polyacene-based frame structure. In the polyacene-based frame structure, an atomic ratio between hydrogen atoms and carbon atoms is 0.05 to 0.50. The atomic ratio between hydrogen atoms and carbon atoms is a value obtained by dividing the number of hydrogen atoms by the number of carbon atoms.

In the polyacene-based organic semiconductor, if the atomic ratio of hydrogen atoms and carbon atoms is 0.50 or less, electronic conductivity improves, and thus, internal resistance of the cell increases. If the atomic ratio of hydrogen atoms and carbon atoms is 0.05 or more, capacity per unit mass increases, and thus, the energy density of the cell increases.

The above-described aromatic condensation polymer is a condensation product of an aromatic hydrocarbon compound and aldehydes. Examples of the aromatic hydrocarbon compound incudes phenol, cresol, and xylenol. Examples of aldehydes may include formaldehyde, acetaldehyde, and furfural.

The negative electrode active material has a specific surface area of preferably 0.1 $m^2/g$ to 200 $m^2/g$, and more preferably 0.5 $m^2/g$ to 50 $m^2/g$. If the specific surface area of the negative electrode active material is 0.1 $m^2/g$ or more, resistance of the achieved power storage device decreases. If the specific surface area of the negative electrode active material is 200 $m^2/g$ or less, irreversible capacity during charging of the obtained power storage device decreases and gas is less likely to be generated during charging. Consequently, the durability of the power storage device increases.

(1-9) Negative Electrode Active Material Layer

The negative electrode active material layer is formed by attaching the negative electrode active material to the surface of the negative electrode current collector. Examples of a method of attaching the negative electrode active material may include coating, printing, injecting, spraying, vapor deposition or pressure bonding.

Figure 3:
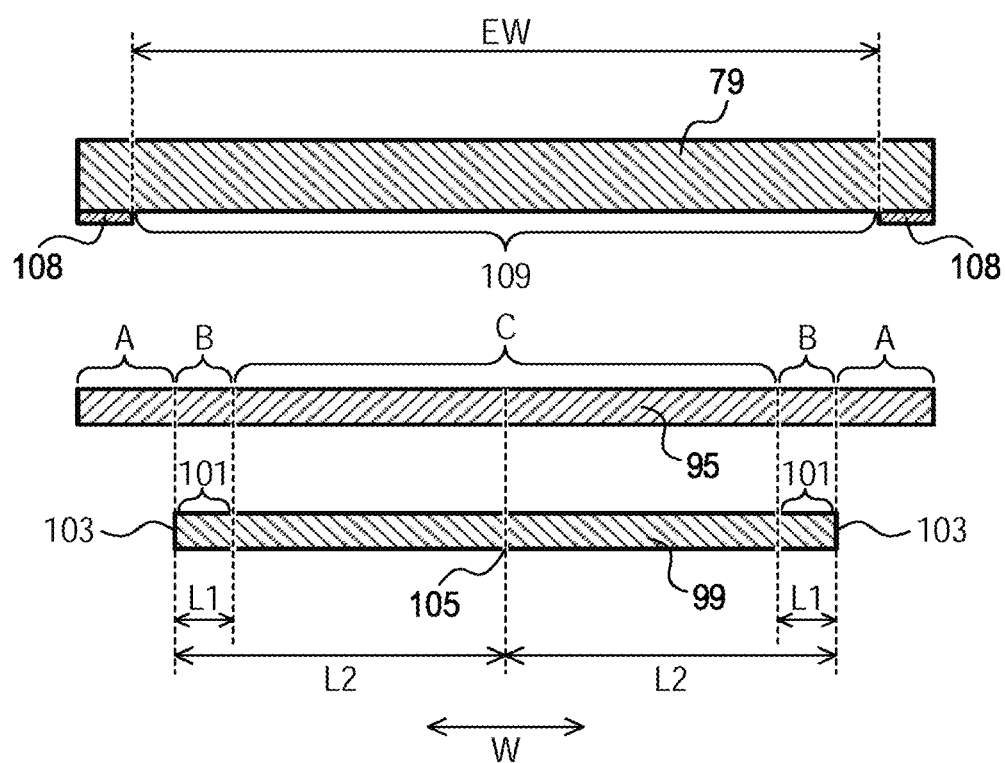
FIG. 3 is an explanatory diagram showing a surplus region A, an end region B, a center region C, and an effective width EW.

As shown in FIG. 3, a negative electrode active material layer 95 includes, for example, a surplus region A, an end region B, and a center region C. FIG. 3 is a schematic view showing the negative electrode active material layer 95 in a cross section parallel to a width direction W of the negative electrode. If the negative electrode has a long strip-shape, the width direction W is a direction orthogonal to a longitudinal direction of the negative electrode. If the negative electrode has a quadrangle shape, the width direction W is a direction parallel to one of the sides of the negative electrode.

The surplus region A is a region not facing a positive electrode active material layer 99 in a thickness direction of the negative electrode and the positive electrode. The end region B is a region facing a positive electrode end region 101 of the positive electrode active material layer 99 in the thickness direction of the negative electrode and the positive electrode. The positive electrode end region 101 is a region extending across a length L1 from an end 103 of the positive electrode active material layer 99 in the width direction W toward a center 105. The center 105 is the center of the positive electrode active material layer 99 in the width direction W. The length L1 accounts for 5% of a length L2 that extends from the 103 to the center 105. The center region C is a region in the negative electrode active material layer 95 other than the surplus region A and the end region B. The center in the width direction W of the negative electrode active material layer 95 faces, for example, the center 105 of the negative electrode and the positive electrode in the thickness direction. The negative electrode active material layer 95 includes, as shown in FIG. 3, for example, the surplus region A and the end region B on each end in the width direction W.

When the negative electrode is used for manufacturing the power storage device, it is preferable that the negative electrode active material layer satisfies Formulas (1) to (3) below. When the negative electrode is used for manufacturing an electrode of a lithium ion rechargeable battery, it is preferable that the negative electrode active material layer satisfies Formulas (1) to (3) below.

$$VA \leq 2.0 \text{ V} \quad \text{Formula (1)}$$

$$VC \leq 1.0 \text{ V} \quad \text{Formula (2)}$$

$$VA/VC \geq 0.7 \quad \text{Formula (3)}$$

VA is a negative electrode potential of the surplus region A after the positive electrode and the negative electrode are short-circuited. VC is a negative electrode potential of the center region C after the positive electrode and the negative electrode are short-circuited. VA and VC are measured by a method described in the below-described embodiments.

It is preferable that the negative electrode active material layer also satisfies Formula (4) below.

$$0 < QA < QC \quad \text{Formula (4)}$$

QA is a discharge capacity of the surplus region A measured after disassembling the power storage device in a charged state. QC is a discharge capacity of the center region C measured after disassembling the power storage device in the charged state. QA and QC are measured by a method described in the below-described embodiments.

It is preferable that QA/QC is 0.001 or more and 0.8 or less, and more preferably 0.002 or more and 0.2 or less. If QA/QC is 0.001 or more and 0.8 or less, over discharging can be reduced, and the precipitation of lithium can be reduced. If QA/QC is 0.002 or more and 0.2 or less, the over discharging can be further reduced, and the precipitation of lithium can be further reduced.

QA/QB is preferably 0.001 or more and 0.8 or less, more preferably 0.002 or more and 0.2 or less. QB is a discharge capacity of the end region B measured after disassembling the power storage device in the charged state. QB is measured by a method described in the below-described embodiments. If QA/QB is 0.001 or more and 0.8 or less, the over discharging can be reduced, and the precipitation of lithium can be reduced. If QA/QB is 0.002 or more and 0.2 or less, the over discharging can be further reduced, and the precipitation of lithium can be further reduced.

QB/QC is preferably 0.7 or more and 0.99 or less, and more preferably 0.8 or more and 0.98 or less. If QB/QC is 0.7 or more and 0.99 or less, the over discharging can be reduced, and the precipitation of lithium can be reduced. If QB/QC is 0.8 or more and 0.98 or less, the over discharging can be further reduced, and the precipitation of lithium can be further reduced.

It is preferable that the negative electrode active material layer satisfies Formula (7) and Formula (9) below.

$$0.7 \leq QB/QC \leq 0.99 \quad \text{Formula (7)}$$

$$QA/QC \leq 0.1 \quad \text{Formula (9)}$$

If the negative electrode active material layer satisfies Formula (7) and Formula (9), the precipitation of lithium can be reduced.

QB/QC is preferably 0.75 or more and 0.95 or less. If QB/QC is 0.75 or more and 0.95 or less, the precipitation of lithium can be further reduced.

QA/QC is preferably 0 or more and 0.04 or less. If QA/QC is 0 or more and 0.04 or less, the precipitation of lithium can be further reduced.

If the negative electrode is used for manufacturing the electrode of the lithium ion rechargeable battery, the density of the negative electrode active material layer is preferably from 1.50 g/cc to 2.00 g/cc, and more preferably from 1.60 g/cc to 1.90 g/cc.

The negative electrode active material layer preferably contains a silicon-based material. Examples of the silicon-based material may include Si, SiO, and SiOC, and a material containing $SiO_x$ is preferable. The value of x is 0 or more and 1.5 or less. If the negative electrode active material layer contains the silicon-based material, capacity of the negative electrode increases.

The content of the silicon-based material in the negative electrode active material layer is preferably 5% by mass or more and 99% by mass or less, more preferably 10% by mass or more and 95% by mass or less, and particularly preferably 15% by mass or more and 50% by mass or less. If the content of the silicon-based material in the negative electrode active material layer is within the above-described ranges, the capacity of the negative electrode further increases.

If the negative electrode active material layer contains the silicon-based material, the coating weight of the negative electrode active material layer is preferably 10 $g/m^2$ or more and 150 $g/m^2$ or less, more preferably 20 $g/m^2$ or more and 90 $g/m^2$ or less, and particularly preferably 30 $g/m^2$ or more and 80 $g/m^2$ or less.

If the negative electrode active material layer is formed on each side of the negative electrode, the coating weight of the negative electrode active material layer means an average coating weight per one side obtained by multiplying a total coating weight of the negative electrode active material layers formed on both sides of the negative electrode by ½. If the negative electrode active material layer is formed only on one side of the negative electrode, the coating weight of the negative electrode active material layer means a coating weight of the negative electrode active material layer formed on only one side of the negative electrode.

If the coating weight of the negative electrode active material layer is within the above-described ranges, the capacity of the negative electrode and the cycle characteristics of and the power storage device are improved. If the content of the silicon-based material in the negative electrode active material layer is 5% by mass or more and 99% by mass or less and the coating weight of the negative electrode active material layer is within the above-described ranges, the capacity of the negative electrode and the cycle characteristics of the power storage device are further improved. Note that the coating weight of the negative electrode active material layer can be measured by a method similar to the method of measuring the coating weight of the positive electrode active material layer.

The negative electrode active material layer has a thickness of preferably 7 µm or more and 150 µm or less, more preferably 10 µm or more and 60 µm or less, and particularly preferably 25 µm or more and 50 µm or less.

If the negative electrode active material layer is formed on each side of the negative electrode, the thickness of the negative electrode active material layer means an average the thickness per one side obtained by multiplying a total thickness of the negative electrode active material layers formed on both sides of the negative electrode by ½. If the negative electrode active material layer is formed on only one side of the negative electrode, the thickness of the negative electrode active material layer means the thickness of the negative electrode active material layer formed on only one side of the negative electrode. Also, the thickness of the negative electrode active material layer is a thickness after the negative electrode active material layer is roll-pressed.

If the thickness of the negative electrode active material layer is within the above-described ranges, the capacity of the negative electrode and the cycle characteristics of the power storage device are improved. If the content of the silicon-based material in the negative electrode active material layer is 5% by mass or more and 99% by mass or less and the thickness of the negative electrode active material layer is within the above-described ranges, the capacity of the negative electrode and the cycle characteristics of the power storage device are further improved.

It is preferable that the negative electrode active material layer includes a carbon-based material. If the negative electrode active material layer includes the carbon-based material, the cycle characteristics of the power storage device are further improved. The content of the carbon-based material in the negative electrode active material layer is preferably 80% by mass or more and 99% by mass or less. If the content of the carbon-based material in the negative electrode active material layer is within this range, the cycle characteristics of the power storage device are further improved.

If the content of the carbon-based material in the negative electrode active material layer is 80% by mass or more and 99% by mass or less, the coating weight of the negative electrode active material layer is preferably 30 $g/m^2$ or more and 150 $g/m^2$ or less, more preferably 60 $g/m^2$ or more and 130 $g/m^2$ or less, and particularly preferably 90 $g/m^2$ or more and 120 $g/m^2$ or less. If the coating weight of the negative electrode active material layer is within the above-described ranges, the capacity of the negative electrode and the cycle characteristics of the power storage device are improved.

If the content of the carbon-based material in the negative electrode active material layer is 80% by mass or more and 99% by mass or less, the thickness of the negative electrode active material layer is preferably 45 µm or more and 220 µm or less, more preferably 60 µm or more and 180 µm or less, and particularly preferably 80 µm or more and 150 µm or less. If the thickness of the negative electrode active material layer is within the above-described ranges, the capacity of the negative electrode and the cycle characteristics of the power storage device are improved.

(1-10) Manufacturing Positive Electrode and Negative Electrode

The positive electrode with the positive electrode active material layer and the negative electrode with the negative electrode active material layer, which are described above, can be manufactured by a known manufacturing method.

The positive electrode can be manufactured as follows, for example. The positive electrode active material, a binder, and a solvent are mixed to prepare a positive electrode slurry. The positive electrode slurry may further contain a conductive material and a thickener as needed.

The positive electrode with the positive electrode active material layer can be manufactured by a method in which the positive electrode slurry is applied to the positive electrode current collector. The positive electrode with the positive electrode active material layer can also be manufactured by a method in which the positive electrode slurry is formed into a sheet-like shape and the sheet-shaped molded product is adhered to the positive electrode current collector.

The negative electrode can be manufactured as follows, for example. The negative electrode active material, a binder, and a solvent are mixed to prepare a negative electrode slurry. The negative electrode slurry may further contain a conductive material and a thickener as needed.

The negative electrode with the negative electrode active material layer can be manufactured by a method in which the negative electrode slurry is applied to the negative electrode current collector. The negative electrode with the negative electrode active material layer can also be manufactured by a method in which the negative electrode slurry is formed into a sheet-like shape and the sheet-like molded product is adhered to the negative electrode current collector.

Examples of the binder contained in the positive electrode slurry or the negative electrode slurry may include a rubber-based binder, fluorine-containing resin, and acrylic resin. An example of the rubber-based binder may be SBR. Examples of the fluorine-containing resin may include fluorine-containing resin obtained by seed polymerization of, for example, polytetrafluoroethylene and/or polyvinylidene fluoride with acrylic resin.

Examples of the solvent contained in the positive electrode slurry or the negative electrode slurry may include water and an organic solvent. Examples of the conductive material contained in the positive electrode slurry or the negative electrode slurry may include acetylene black, Ketjenblack™ carbon black, graphite, and metal powder. An example of the thickener contained in the positive electrode slurry or the negative electrode slurry may be carboxymethyl cellulose (CMC).

The addition amount of the binder and the conductive material in the positive electrode slurry or the negative electrode slurry can be suitably adjusted depending on the electric conductivities of the active materials to be used, the shape of the electrodes to be made, and so on. The addition amount of the binder and the conductive material is preferably from 2% by mass to 20% by mass, and particularly preferably from 2% by mass to 10% by mass. The active material means the positive electrode active material and/or the negative electrode active material.

(1-11) Separator

The material for the separator in the power storage device of the present disclosure is preferably a separator having an air permeance in the rage of 1 sec or more and 200 sec or less. The air permeance is a value measured by a method in accordance with JIS P8117.

The separator can be suitably selected and used among from, for example, nonwoven fabrics and microporous films made of polyethylene, polypropylene, polyester, cellulose, polyolefin, and cellulose/rayon. For the separator, nonwoven fabrics made of polyethylene, polypropylene, and cellulose/rayon are preferable.

The separator has a thickness of, for example, 5 μm to 20 μm, and preferably 5 μm to 15 μm. If the thickness of separator is 5 μm or more, short-circuit is less likely to occur. If the thickness of the separator is 20 μm or less, the resistance decreases.

(1-12) Electrolyte Solution

In the power storage device according to the present disclosure, it is possible to use, for the electrolyte solution, an electrolyte solution containing an aprotic organic solvent in which lithium salt is dissolved, for example.

The electrolyte solution contains, for example, an aprotic organic solvent. Examples of the aprotic organic solvent may include cyclic carbonate and chain carbonate. Examples of the cyclic carbonate may include ethylene carbonate (EC), propylene carbonate (PC), and butylene carbonate. Examples of the chain carbonate may include dimethyl carbonate (DMC), ethyl methyl carbonate (EMC), diethyl carbonate (EC), and methyl propyl carbonate. The electrolyte solution may be a mixed solvent in which two or more types of the above-described substances are mixed.

The aprotic organic solvent may contain an organic solvent other than the cyclic carbonate and the chain carbonate. Examples of the organic solvent other than the cyclic carbonate and the chain carbonate may include cyclic ether, chain carboxylic acid ester, and chain ether. An example of the cyclic ether may be γ-butyrolactone. An example of the chain carboxylic acid ester may be ethyl propionate. An example of the chain ether may be dimethoxyethane.

The electrolyte solution contains an electrolyte. An example of the electrolyte may be lithium salt. Examples of the lithium salt may include $LiClO_4$, $LiAsF_6$, $LiBF_4$, $LiPF_6$, $LiN(C_2F_5SO_2)_2$, and $LiN(CF_3SO_2)_2$.

The lithium salt is preferably $LiPF_6$. $LiPF_6$ is high in ion conductivity and low in resistance. The concentration of the lithium salt in the electrolyte solution is preferably 0.1 mol/L or more, and more preferably from 0.5 mol/L to 1.5 mol/L. If the concentration of the lithium salt in the electrolyte solution is within the above-described ranges, the internal resistance of the power storage device can be decreased.

2. METHOD FOR MANUFACTURING POWER STORAGE DEVICE NEGATIVE ELECTRODE

(2-1) Configuration of Electrode Manufacturing Apparatus 1

The negative electrode of the power storage device (hereinafter also referred to as power storage device negative electrode) can be manufactured by, for example, an electrode manufacturing apparatus 1 shown in FIG. 1.

The configuration of the electrode manufacturing apparatus 1 will be described based on FIG. 1. The electrode manufacturing apparatus 1 comprises electrolyte solution tanks 3, 5, a cleaning tank 7, conveyor rollers 9, 11, 13, 15, 17, 19, 21, 23, 25, 27, 29, 31, 33, 35, 37, 39, 41, 43, 45 (hereinafter also collectively referred to as group of conveyor rollers), a supply roll 47, a wind-up roll 49, counter electrode members 51, porous insulating members 53, supporting tables 55, circulation filters 57, two direct current power sources 61, and a blower 63.

The electrolyte solution tank 3 is an upwardly open rectangular tank. The bottom surface of the electrolyte solution tank 3 has an approximately U-shaped cross-section. In the electrolyte solution tank 3, there are a partition plate 69, four counter electrode members 51, four porous insulating members 53, and the conveyor roller 17.

The partition plate 69 is supported by a supporting rod 67 penetrating the upper end of the partition plate 69. The supporting rod 67 is secured to a wall and the like that is not shown in the drawing. The partition plate 69 except for the upper end thereof is located inside the electrolyte solution tank 3. The partition plate 69 extends in an up-down direction and divides the interior of the electrolyte solution tank 3 into two spaces. At the lower end of the partition plate 69, the conveyor roller 17 is attached. The partition plate 69 and the conveyor roller 17 are secured by the supporting rod 68 penetrating the partition plate 69 and the conveyor roller 17. The partition plate 69 is notched in the vicinity of the lower end thereof so as not to be in contact with the conveyor roller 17. There is a space between the conveyor roller 17 and the bottom surface of the electrolyte solution tank 3.

The four counter electrode members 51 are respectively supported by the corresponding supporting rods 70 penetrating the upper ends of the counter electrode members 51 and extend in the up-down direction. The supporting rods 70 are secured to a wall and the like that is not shown in the drawing. The counter electrode members 51 except for the upper ends thereof are located inside the electrolyte solution tank 3. Two out of the four counter electrode members 51 are disposed to sandwich the partition plate 69 from both sides. The remaining two counter electrode members 51 are disposed along the inner surface of the electrolyte solution tank 3.

There are spaces 71 between the counter electrode members 51 disposed beside the partition plate 69 and the counter electrode members 51 disposed along the inner surface of the electrolyte solution tank 3. The counter electrode members 51 are connected to the positive poles of the direct current power sources 61. The detailed structure of the counter electrode members 51 will be described below.

The counter electrode members 51 each have the porous insulating member 53 attached to the surface near the space 71. The detailed structure of the porous insulating members 53 will be described below.

The cleaning tank 7 has basically the same structure as that of the electrolyte solution tank 3. However, the counter electrode members 51 and the porous insulating members 53 do not exist in the cleaning tank 7.

The electrolytic tank 5 has basically the same structure as that of the electrolyte solution tank 3. However, there is a conveyor roller 27 in the electrolyte solution tank 5 in place of the conveyor roller 17.

The group of conveyor rollers conveys an electrode precursor 73, which will be described below, along a specific path. The path extends from the supply roll 47, passes through the electrolyte solution tank 3, the electrolyte solution tank 5, and the cleaning tank 7 in this order, and reaches the wind-up roll 49.

The portion of the path passing through the electrolyte solution tank 3 first goes downward through the space 71 between the porous insulating member 53 attached along the inner surface of the electrolyte solution tank 3 and the porous insulating member 53 beside the partition plate 69 facing the former porous insulating member 53, then is changed in direction of movement to upward by the conveyor roller 17, and finally moves upward through the space 71 between the porous insulating member 53 attached along the inner surface of the electrolyte solution tank 3 and the porous insulating member 53 beside the partition plate 69 facing the former porous insulating member 53.

The portion of the path passing through the electrolyte solution tank 5 first goes downward through the space 71 between the porous insulating member 53 attached along the inner surface of the electrolyte solution tank 5 and the porous insulating member 53 beside the partition plate 69 facing the former porous insulating member 53, then is changed in direction of movement to upward by the conveyor roller 27, and finally goes upward through the space 71 between the porous insulating member 53 attached along the inner surface of the electrolyte solution tank 5 and the porous insulating member 53 beside the partition plate 69 facing the former porous insulating member 53.

The portion of the path passing through the cleaning tank 7 first goes downward between the inner surface of the cleaning tank 7 and the partition plate 69, then is changed in direction of movement to upward by the conveyor roller 37, and finally goes upward between the inner surface of the cleaning tank 7 and the partition plate 69.

Among the group of conveyor rollers, the conveyor rollers 15, 21, 25, and 29 are made of a conductive material. The conveyor rollers 15, 21, 25, 29 are connected to the negative poles of the direct current power sources 61. The conveyor roller 13 presses the electrode precursor 73 toward the conveyor roller 15. The conveyor roller 19 presses the electrode precursor 73 toward the conveyor roller 21. The conveyor roller 23 presses the electrode precursor 73 toward the conveyor roller 25. The conveyor roller 31 presses the electrode precursor 73 toward the conveyor roller 29. The group of conveyor rollers corresponds to a conveyer assembly. The conveyor rollers 15, 21, 25, 29 correspond to conductive conveyor rollers.

The conveyor rollers 13, 19, 23, 31, except for shaft portions thereof, are made of elastomer. That is, the conveyor rollers 13, 19, 23, 31, including the surfaces thereof, are made of elastomer. The elastomer is an example of an elastic body. Accordingly, the conveyor rollers 13, 19, 23, 31 are elastically deformable.

The elastomer may be natural rubber or synthetic rubber. Examples of the elastomer may include EPDM, EPR, SBR, NBR, isoprene rubber, butadiene rubber, acrylic rubber, chloroprene rubber, silicone rubber, urethane rubber, and fluoro rubber.

The supply roll 47 has the electrode precursor 73 wound around the outer circumference thereof. That is, the supply roll 47 holds the electrode precursor 73 in a wound state. The group of conveyor rollers draws out and conveys the electrode precursor 73 held by the supply roll 47.

The wind-up roll 49 winds up and keeps the power storage device negative electrode 75 conveyed by the group of conveyor rollers. The power storage device negative electrode 75 is manufactured by doping the electrode precursor 73 with alkali metal in the electrolyte solution tanks 3, 5.

The way of doping with lithium may be intercalation of ionic lithium into the active material, formation of lithium alloy, or consumption of lithium ions by formation of an SEI (Solid Electrolyte Interface) film.

The counter electrode members 51 are accommodated in the electrolyte solution tanks 3, 5 as described above. The counter electrode members 51 have a plate-like shape. The counter electrode members 51 have a structure in which a conductive base material and an alkali metal containing plate are stacked. Examples of the material for the conductive base material may include copper, stainless steel, and nickel. The form of the alkali metal containing plate is not particularly limited, and examples thereof may include a lithium plate and a lithium alloy plate.

FIG. 3 shows an alkali metal containing plate 79. The alkali metal containing plate 79 may be covered with, for example, a mask 108 in a portion in the vicinity of the end of the alkali metal containing plate 79 in the width direction W. The mask 108 may be a resin plate 97, which will be described below, or other member.

In the alkali metal containing plate 79, a portion that is not covered with the mask 108 or the like is referred to as an exposed portion 109. If there is no mask 108, the entire alkali metal containing plate 79 is the exposed portion 109. The length of the exposed portion 109 in the width direction W is referred to as an effective width EW.

If the mask 108 is not used, the effective width EW can be varied by changing the width of the alkali metal containing plate 79. If the mask 108 is used, the effective width EW can be varied by changing the width of the mask 108.

When the electrode precursor 73 passes through the electrolyte solution tanks 3, 5, as shown in FIG. 3, the alkali metal containing plate 79 faces the negative electrode active material layer 95. By changing the effective width EW, doping amounts in the surplus region A, the end region B, and the center region C can be changed. The smaller the effective width EW is, the smaller the doping amounts in the surplus region A and the end region B become compared to the doping amount of the center region C. If the effective width EW is reduced, the amount of decrease in the doping amount is more significant in the surplus region A than in the end region B.

The smaller the effective width EW is, the smaller the discharge capacity QA and the discharge capacity QB become compared to the discharge capacity QC. If the effective width EW is reduced, the amount of decrease in the discharge capacity is more significant in the discharge capacity QA than in the discharge capacity QB.

The smaller the effective width EW is, the higher the negative electrode potential VA and the negative electrode potential VB become compared to the negative electrode potential VC. If the effective width EW is reduced, the amount of change in the negative electrode potential is more significant in the negative electrode potential VA than in the negative electrode potential VB. The thickness of the alkali metal containing plate may be, for example, from 0.03 mm to 3 mm.

The porous insulating members 53 have a plate-like shape. The porous insulating members 53 are attached to the surfaces of the counter electrode members 51. The plate-like shape of the porous insulating members 53 is a shape when the porous insulating members 53 are attached to the surfaces of the counter electrode members 51. The porous insulating members 53 may be members that maintain the given shape by themselves, or may be members, such as nets, that can be easily deformed.

The porous insulating members 53 and the electrode precursor 73, conveyed by the group of conveyor rollers, are not in contact with each other. A shortest distance from the surface of the porous insulating member 53 to the electrode precursor 73 is preferably in the rage of 0.5 mm to 100 mm, particularly preferably in the rage of 1 mm to 10 mm. The shortest distance is a distance between a point on the surface of the porous insulating member 53 that is closest to the electrode precursor 73 and the electrode precursor 73.

The porous insulating members 53 are porous. Accordingly, a dope solution, which will be described below, can pass through the porous insulating members 53. This allows the counter electrode members 51 to be in contact with the dope solution.

Examples of the porous insulating members 53 may include resin mesh. Examples of the resin may include polyethylene, polypropylene, nylon, polyether ether ketone, and polytetrafluoroethylene.

The aperture size of the mesh can be appropriately set and may be set to, for example, 0.1 μm to 10 mm; however, it is preferably within a range of 0.1 mm to 5 mm. The thickness of mesh can be suitably set and may be set to, for example, 1 μm to 10 mm; however, it is preferably within a range of 30 μm to 1 mm. The aperture ratio of the mesh can be suitably set and may be set to, for example, 5% to 95%; however, it is preferably within a range of 50% to 95%.

The porous insulating member 53 may be entirely made of an insulating material, or may partially comprise an insulating layer.

Figure 4:
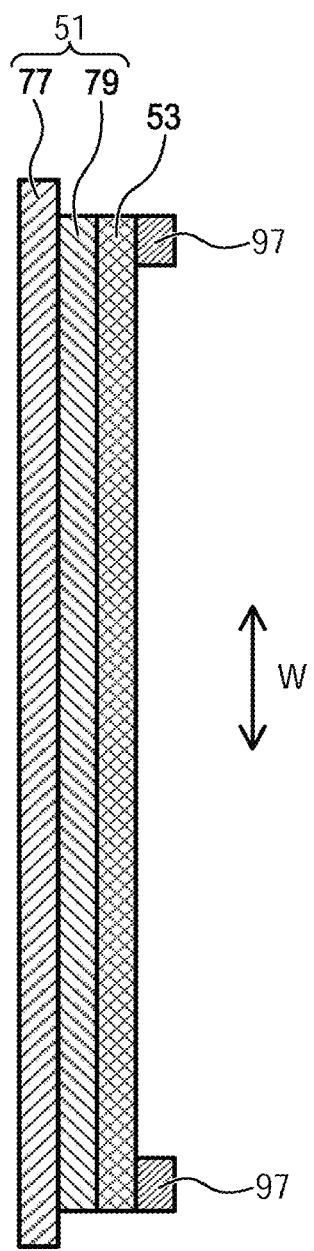
FIG. 4 is an explanatory diagram showing a configuration of a counter electrode member, a porous insulating member, and a resin plate.

For example, as shown in FIG. 4, the resin plate 97 can be used. The resin plate 97 covers a part of the surface of the alkali metal containing plate 79. The resin plate 97 is screwed to a conductive base material 77. The alkali metal containing plate 79 and the porous insulating member 53 are sandwiched by the resin plate 97 and the conductive base material 77. The alkali metal ions are less likely to be eluted into the dope solution from the portion of the alkali metal containing plate 79 covered with the resin plate 97. Therefore, with the resin plate 97, the amount of eluted alkali metal ions can be reduced.

It is also possible to control the amount of eluted alkali metal ions by adjusting the width of the resin plate 97. The resin plate 97 may be the mask 108 shown in FIG. 3. In this case, as shown in FIG. 4, the resin plate 97 covers the alkali metal containing plate 79 in the vicinity of each end in the width direction W. By varying the width of the mask 108, the effective width EW can be changed regardless of the width of the alkali metal containing plate 79.

Materials of the resin plate 97 are not particularly limited. Examples of the material of the resin plate 97 may include a resin, such as polyethylene, polypropylene, nylon, polyetheretherketone, and polytetrafluoroethylene.

The supporting tables 55 support the electrolyte solution tanks 3, 5 and the cleaning tank 7 from below. The height of the supporting tables 55 can be changed. When the supporting tables 55 arc lowered while the positions of the partition plates 69, the counter electrode members 51, and the porous insulating members 53 in the up-down direction are maintained, the electrolyte solution tanks 3, 5 can be moved downward relative to the partition plates 69, the counter electrode members 51, and the porous insulating members 53. When the supporting tables 55 are raised, the electrolyte solution tanks 3, 5 can be moved upward relative to the partition plates 69, the counter electrode members 51, and the porous insulating members 53.

The circulation filters 57 are respectively provided to the electrolyte solution tanks 3, 5. The circulation filters 57 each comprise a filter 81, a pump 83, and a piping 85.

In the circulation filter 57 of the electrolyte solution tank 3, the piping 85 extends from the electrolyte solution tank 3, sequentially passes through the pump 83 and the filter 81, and returns to the electrolyte solution tank 3. The dope solution in the electrolyte solution tank 3 circulates in the piping 85 and the filter 81 and returns again to the electrolyte solution tank 3 due to the driving force of the pump 83. At this time, impurities and the like in the dope solution are filtered by the filter 81. The impurities include impurities precipitated from the dope solution, and impurities produced from the electrode precursor 73. In FIG. 1, illustration of the dope solution is omitted for convenience.

In the circulation filter 57 of the electrolyte solution tank 5, the piping 85 extends from the electrolyte solution tank 5, sequentially passes through the pump 83 and the filter 81, and returns to the electrolyte solution tank 5. The dope solution in the electrolyte solution tank 5 circulates in the piping 85 and the filter 81 and returns again to the electrolyte solution tank 5 due to the driving force of the pump 83. The circulation filter 57 of the electrolyte solution tank 5 has the same functions and effects as those of the circulation filter 57 of the electrolyte solution tank 3.

Examples of the material for the filter 81 may include a resin such as polypropylene and polytetrafluoroethylene. The pore diameter of the filter 81 can be suitably set and may be set to, for example, 30 μm to 50 μm.

The negative terminal of one of the two direct current power sources 61 (hereinafter referred to as one of the direct current power source 61) is connected to each of the conveyor rollers 15, 21. The positive terminal of the one of the direct current power sources 61 is connected to each of four counter electrode members 51 in total. The four counter electrode members 51 are the counter electrode members 51 in the electrolyte solution tank 3. The electrode precursor 73 is in contact with the conductive conveyor rollers 15, 21, and the electrode precursor 73 and the counter electrode members 51 in the electrolyte solution tank 3 are electrically connected since the electrode precursor 73 and the counter electrode members 51 in the electrolyte solution tank 3 are inside the dope solution which is the electrolyte solution.

The negative terminal of the other of the two direct current power sources 61 (hereinafter referred to as other direct current power source 61) is connected to each of the conveyor rollers 25, 29. The positive terminal of the other direct current power source 61 is connected to each of four counter electrode members 51 in total. The four counter electrode members 51 are the counter electrode members 51 in the electrolyte solution tank 5. The electrode precursor 73 is in contact with the conductive conveyor rollers 25, 29. The electrode precursor 73 and the counter electrode members 51 in the electrolyte solution tank 5 are inside the dope solution which is the electrolyte solution. Accordingly, the electrode precursor 73 and the counter electrode members 51 in the electrolyte solution tank 5 are electrically connected.

The blower 63 blows gas to the power storage device negative electrode 75 coming out of the cleaning tank 7 to vaporize the cleaning solution, and dries the power storage device negative electrode 75. The gas that is used is preferably a gas inert with respect to the active material doped with the lithium. Examples of such a gas may include helium gas, neon gas, argon gas, and dehumidified air from which water has been removed.

(2-2) Structure of Electrode Precursor 73

Figure 2A:
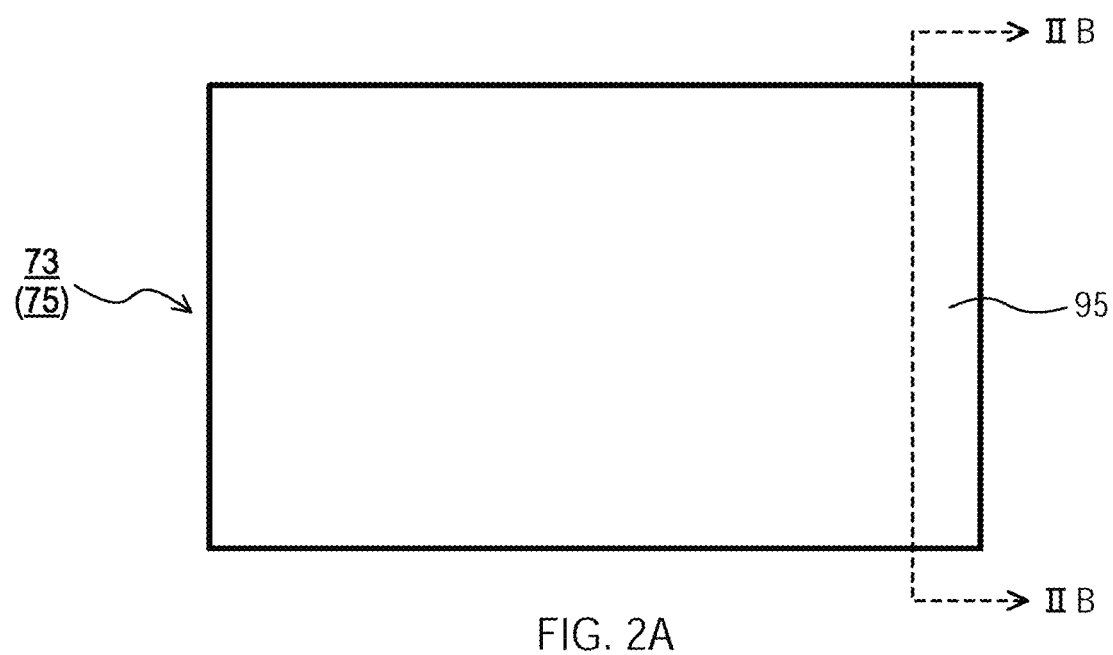
FIG. 2A is a plan view showing a configuration of an electrode precursor and a power storage device negative electrode.
Figure 2B:
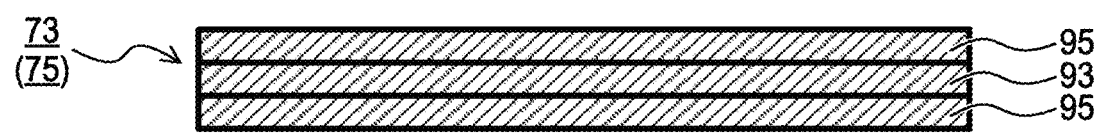
FIG. 2B is a sectional view cut along a cross-section IIB-IIB in FIG. 2A.

The structure of the electrode precursor 73 will be described based on FIG. 2A and FIG. 2B. The electrode precursor 73 is a long strip-like member. As shown in FIG. 2B, the electrode precursor 73 comprises a negative electrode current collector 93 and negative electrode active material layers 95. The negative electrode active material layers 95 are formed on both sides of the negative electrode current collector 93. In the electrode precursor 73, the negative electrode active material layers 95 are not yet doped with lithium.

The negative electrode active material layers 95 can be formed by a method in which the negative electrode slurry is applied on the negative electrode current collector 93. The negative electrode active material layers 95 can be formed also by a method in which the negative electrode slurry is formed into a sheet-like shape and the sheet-shaped molded material is adhered to the negative electrode current collector 93. The negative electrode active material layer 95 comprises, for example, as shown in FIG. 3, the surplus region A, the end region B, and the center region C.

(2-3) Method for Manufacturing Negative Electrode of Power Storage Device

The electrode precursor 73 is wound around the supply roll 47. The dope solution is stored in the electrolyte solution tanks 3, 5. The dope solution contains lithium ions and a solvent. Examples of the solvent may include an organic solvent. The organic solvent is preferably an aprotic organic solvent.

Examples of the aprotic organic solvent may include ethylene carbonate, propylene carbonate, butylene carbonate, dimethyl carbonate, diethyl carbonate, methyl ethyl carbonate, 1-fluoroethylene carbonate, γ-butyrolactone, acetonitrile, dimethoxyethane, tetrahydrofuran, dioxolan, methylene chloride, sulfolane, diethylene glycol dimethyl ether (diglyme), diethylene glycol methyl ethyl ether, triethylene glycol dimethyl ether (triglyme), triethylene glycol butyl methyl ether, tetraethylene glycol dimethyl ether (tetraglyme), and ionic liquid. Examples of the ionic liquid may include quaternary imidazolium salt, quaternary pyridinium salt, quaternary pyrrolidinium salt, and quaternary piperidinium salt. The organic solvent may consist of a single component, or may be a mixed solvent containing two or more types of components.

The lithium ions contained in the dope solution are ions that make up lithium salt. Examples of an anionic moiety making up the lithium salt may include phosphorous anion including fluoro group such as $PF_6^-$, $PF_3(C_2F_5)_3^-$, and $PF_3(CF_3)_3^-$; boron anion including fluoro group or cyano group such as $BF_4^-$, $BF_2(CF)_2^-$, $BF_3(CF_3)^-$, $B(CN)_4^-$; sulfonyl imide anion including fluoro group such as $N(FSO_2)_2^-$, $N(CF_3SO_2)_2^-$, $N(C_2F_5SO_2)_2^-$; and organic sulfone acid anion including fluoro group such as $CF_3SO_3^-$.

The concentration of the lithium salt in the dope solution is preferably 0.1 mol/L or more, and more preferably within a range of 0.5 mol/L to 1.5 mol/L. If the concentration of the lithium salt in the dope solution is within the above-described ranges, lithium doping efficiently progresses.

The dope solution may further contain an additive/additives such as vinylene carbonate, vinyl ethylene carbonate, 1-fluoroethylene carbonate, 1-(trifluoromethyl) ethylene carbonate, succinic anhydride, maleic anhydride, propanesultone, and diethyl sulfone.

The cleaning solution is stored in the cleaning tank 7. The cleaning solution preferably contains, for example, an aprotic solvent. An example of the aprotic solvent may be at least one type selected from carbonate-based solvent, ester-based solvent, ether-based solvent, hydrocarbon-based solvent, keton-based solvent, nitrile-based solvent, sulfur-containing solvent, and amide-based solvent.

The cleaning solution may substantially consist of the aprotic solvent, or may contain other component(s) in addition to the aprotic solvent. The boiling point of the aprotic solvent is preferably 30° C. or higher and 200° C. or lower, more preferably 40° C. or higher and 150° C. or lower, and further preferably 50° C. or higher and 120° C. or lower. A boiling point of 30° C. or higher can inhibit excessive evaporation of the cleaning solution in the cleaning tank 7. A boiling point of 200° C. or lower facilitates removal of the cleaning solution from a cleaned power storage device negative electrode 75.

It is preferable that the composition of the dope solution stored in the electrolyte solution tank 3 and the composition of the dope solution stored in the electrolyte solution tank 5 are different. In this case, the power storage device negative electrode 75 with a higher quality can be efficiently manufactured.

An example of the state in which the compositions of the dope solutions in the electrolyte solution tanks 3, 5 are different may be a state in which the concentration of the SEI film forming component in the dope solution stored in the electrolyte solution tank 3 is higher than the concentration of the SEI film forming component in the dope solution stored in the electrolyte solution tank 5. The composition of the dope solution stored in the electrolyte solution tank 3 being different from the composition of the dope solution stored in the electrolyte solution tank 5 corresponds to conditions for doping the active material with the lithium being different between in a first doping process and in a second doping process.

Subsequently, the electrode precursor 73 is drawn out from the supply roll 47 and conveyed along the above-described path by the group of conveyor rollers. When the electrode precursor 73 passes through the electrolyte solution tanks 3, 5, the active material contained in the negative electrode active material layer 95 is doped with the lithium.

As described above, the process of the doping with the lithium corresponds to the doping processes. It is preferable that the current density in the first doping process performed in the electrolyte solution tank 3 and the current density in the second doping process performed in the electrolyte solution tank 5 are different. In this case, the power storage device negative electrode 75 with a higher quality can be efficiently manufactured.

An example of the state in which the current densities are different in the first doping process and the second doping process may be a state in which the current density in the first doping process is higher or lower than the current density in the second doping process. The current density in the first doping process and the current density in the second doping process being different corresponds to the conditions for doping the active material with the lithium being different between in the first doping process and in the second doping process.

If the counter electrode members 51 stored in the electrolyte solution tanks 3, 5 each comprise the conductive base material and the lithium containing plate disposed on the conductive base material, the mass of the lithium that is contained in the lithium containing plate stored in the electrolyte solution tank 3 and the mass of the lithium that is contained in the lithium containing plate stored in the electrolyte solution tank 5 may be different.

The effective width EW in the electrolyte solution tank 3 and the effective width EW in the electrolyte solution tank 5 may be the same or different; however, it is preferable that they are different. An example of a method to differentiate the effective width EW in the electrolyte solution tank 3 from the effective width EW in the electrolyte solution tank 5 may include a method in which the mask 108 shown in FIG. 3 is used to vary the effective width EW in the electrolyte solution tank 3 or in the electrolyte solution tank 5. Another example of the method to differentiate the effective width EW in the electrolyte solution tank 3 from the effective width EW in the electrolyte solution tank 5 may include a method in which the width of the alkali metal containing plate 79 itself in the electrolyte solution tank 3 or the width of the alkali metal containing plate 79 itself in the electrolyte solution tank 5 is changed.

An example of the state in which the masses of the lithium contained in the lithium containing plates stored in the electrolyte solution tanks 3, 5 are different may be a state in which the mass of the lithium contained in the lithium containing plate stored in the electrolyte solution tank 3 is larger or smaller than the mass of the lithium contained in the lithium containing plate stored in the electrolyte solution tank 5. The mass of the lithium contained in the lithium containing plate stored in the electrolyte solution tank 3 and the mass of the lithium contained in the lithium containing plate stored in the electrolyte solution tank 5 being different corresponds to the conditions for doping the negative electrode active material with the lithium being different between in the first doping process and in the second doping process.

Doping of the negative electrode active material with the lithium makes the electrode precursor 73 into the power storage device negative electrode 75. While being conveyed by the group of conveyor rollers, the power storage device negative electrode 75 is cleaned in the cleaning tank 7. Finally, the power storage device negative electrode 75 is wound up by the wind-up roll 49. The power storage device negative electrode 75 has the same structure as that of the electrode precursor 73 except that the negative electrode active material is doped with lithium.

The electrode manufacturing apparatus 1 is suitable for manufacturing power storage device negative electrodes of lithium ion capacitors or batteries, and particularly suitable for manufacturing power storage device negative electrodes of lithium ion capacitors or lithium ion rechargeable batteries.

The ratio of doping the negative electrode active material layer with lithium is preferably 5% or more and 95% or less relative to the discharge capacity C2 of the negative electrode. In this case, the capacity of the negative electrode and the cycle durability are both improved. The discharge capacity C2 of the negative electrode is a value obtained by dividing the discharge capacity of the negative electrode when the negative electrode is charged and discharged between 0 V vs. Li/Li+ to 3 V vs. Li/Li+ by the mass of the negative electrode active material contained in the negative electrode active material layer.

3. METHOD FOR MANUFACTURING BATTERY

The method for manufacturing the battery according to the present disclosure is a method for manufacturing the battery comprising the positive electrode, the negative electrode, and the electrolyte; the method includes the processes for manufacturing the power storage device negative electrode in accordance with "2. Method for Manufacturing Power Storage Device Negative Electrode" described above.

The battery is not particularly limited as long as the battery uses insertion/desorption of alkali metal ions. The battery may be a non-rechargeable battery of a rechargeable battery. Examples of the battery may include lithium ion rechargeable batteries, sodium ion rechargeable batteries, and air cells. Among them, the lithium ion rechargeable batteries are preferable.

The basic structure of the positive electrode of the battery may be the general structure. Examples of the positive electrode active material that can be used may include an organic active material such as a nitroxy radical compound, and oxygen in addition to the above-described materials.

The form of the electrolyte of the battery is generally a liquid electrolyte solution. The basic composition of the electrolyte solution is the same as the composition of the above-described dope solution. The concentration of the alkali metal ions and the concentration of the alkali metal salt in the electrolyte are preferably 0.1 mol/L or more, and more preferably in a range of 0.5 mol/L to 1.5 mol/L. The electrolyte may have a gel-like or solid-like form in order to inhibit liquid leakage.

The battery may comprise a separator between the positive electrode and the negative electrode to inhibit a physical contact of the positive electrode and the negative electrode. Examples of the separator may include unwoven fabric or porous film made of raw material such as cellulose rayon, polyethylene, polypropylene, polyamide, polyester, and polyimide.

An example of the structure of the battery may be that of a stacked-type cell in which three or more of a plate-shaped constituent unit, including the positive electrode, the negative electrode, and the separator interposed therebetween, are stacked to form a laminate, and the laminate is sealed in an outer film. The laminate corresponds to the electrode assembly. Another form of the structure of the battery may be a wound-type cell in which a wound body is sealed in an outer film or an outer can. The wound body comprises a long strip-shaped negative electrode, separator, positive electrode, and the separator that are stacked in this order and wound.

The battery can be manufactured by, for example, forming a basic structure, including at least the negative electrode and the positive electrode, and by injecting the electrolyte into the basic structure.

4. EXAMPLES

(4-1) Manufacture of Power Storage Device Negative Electrode of Example 1-1

A long strip-like negative electrode current collector was prepared. The dimensions of the negative electrode current collector were 150 mm in width, 100 m in length, and 8 μm in thickness. The surface roughness Ra of the negative electrode current collector was 0.1 μm. The negative electrode current collector was made of a copper foil.

As shown in FIG. 2B, the negative electrode active material layer 95 was formed on each side of the negative electrode current collector 93. The negative electrode active material layer 95 formed on each side of the negative electrode current collector 93 had an average thickness of 50 μm per one side. The negative electrode active material layers 95 were formed along the longitudinal direction of the negative electrode current collector 93. The negative electrode active material layers 95 were formed in the center portion of the negative electrode current collector 93 in the width direction to extend 120 mm in width. Negative electrode active material layer unformed portions at both ends of the negative electrode current collector 93 in the width direction W were each 15 mm. The negative electrode active material layer unformed portions are portions in which the negative electrode active material layers 95 are not formed.

Then, the resultant was dried, pressed and cut to obtain the electrode precursor 73. The electrode precursor 73 had a width of 135 mm. The electrode precursor 73 comprised the negative electrode active material layer 95 having a width of 120 mm. The electrode precursor 73 comprised the negative electrode active material layer unformed portion on only a one side in the width direction W. The negative electrode active material layer unformed portion had a width of 15 mm.

The negative electrode active material layers 95 each contained the negative electrode active material, carboxymethyl cellulose, acetylene black, a binder, and a dispersant at a mass ratio of 88:3:5:3:1. The negative electrode active material was a mixture of a silicon-based active material and a graphite-based active material. The active material contained the silicon-based active material and the graphite-based active material at a mass ratio of 2:8. The silicon-based active material contained SiOx. The value of x was 1.0. The acetylene black corresponds to a conductive agent.

Subsequently, the counter electrode member was manufactured. First, a long copper plate having a thickness 2 mm was prepared. On the copper plate, a lithium metal plate was adhered. The lithium metal plate was 120 mm in width, 800 mm in length and 1 mm in thickness. The lithium metal plate was adhered along the longitudinal direction of the copper plate. The copper plate to which the lithium metal plate was adhered in this way formed the counter electrode member 51. Eight pieces of identical counter electrode member 51 were manufactured. The lithium metal plate corresponds to the alkali metal containing plate 79.

The electrode manufacturing apparatus 1 shown in FIG. 1 was prepared, and the electrode precursor 73 was installed. The counter electrode member 51 was installed in each of the electrolyte solution tanks 3, 5. Then the electrolyte solution was supplied into the electrolyte solution tanks 3, 5. The electrolyte solution was a solution containing 1.4 M of $LiPF_6$. The solvent of the electrolyte solution was a mixed solvent containing ethylene carbonate, 1-fluoroethylene carbonate, and ethyl methyl carbonate at a volume ratio of 1:2:7.

Subsequently, the electrode precursor 73 and the counter electrode member 51 installed in the electrode manufacturing apparatus 1 were connected to a direct current power source having a current voltage monitor, and an electric current of 5 A was applied while the electrode precursor 73 was conveyed at a speed of 0.1 m/min. At this time, the center of the negative electrode active material layer 95 on the electrode precursor 73 in the width direction W coincided with the center of the lithium metal plate on the counter electrode member 51 in the width direction W. The time length to apply the electric current was set to a time length in which the lithium doping ratio in the negative electrode active material layer became 25% of the discharge capacity C2 of the negative electrode, taking into account of irreversible capacity.

The irreversible capacity was estimated in advance by measuring the discharge capacity of the negative electrode doped with lithium. Through these processes, the negative electrode active material in the negative electrode active material layer 95 was doped with lithium, whereby the electrode precursor 73 was formed into the power storage device negative electrode 75. In the present example and later-described examples and comparative examples, the power storage device negative electrode is a negative electrode for a lithium ion rechargeable battery.

The power storage device negative electrode 75 was passed through the cleaning tank 7 and was wound up. The cleaning tank 7 stored DMC (dimethyl carbonate) at 25° C. Accordingly, the power storage device negative electrode 75 was manufactured.

(4-2) Manufacture of Power Storage Device Positive Electrode of Example 1-1

A long strip-like positive electrode current collector was prepared. The dimensions of the positive electrode current collector were 150 mm in width, 100 m in length, and 12 μm in thickness. The positive electrode current collector was made of an aluminum foil.

The positive electrode current collector was provided with a positive electrode primer layer formed on each side thereof. Furthermore, the positive electrode primer layer was provided with a positive electrode active material layer formed thereon to prepare a positive electrode. Then, the positive electrode active material layer was roll-pressed and cut to obtain the positive electrode. The positive electrode current collector of the positive electrode had a width of 125 min. The positive electrode active material layer of the positive electrode had a width of 110 mm. The positive electrode active material layer formed on each side of the positive electrode had an average thickness of 67 μm per one side.

The positive electrode had a positive electrode active material layer unformed portion on only one side of the positive electrode in the width direction W. The positive electrode active material layer unformed portion is a portion in which the positive electrode active material layer is not formed in the positive electrode. The positive electrode active material layer unformed portion had a width of 15 mm. The positive electrode active material layer contained lithium cobalt oxide, acetylene black, and polyvinylidene fluoride at a mass ratio of 100:3:3.

A tripolar cell, in which the positive electrode obtained through the above-described processes was used as a working electrode and metal lithium was used as a counter electrode and a reference electrode, was prepared to conduct a cyclic voltammetry measurement. Conditions of measurement were a scanning speed of 0.1 mV/sec and a voltage range of 3.0 V to 4.3 V. From results of measurement after second cycle, the area ratio of a reduction current to an oxidation current was estimated as 0.99, and the capacity calculated from the area of the reduction current was 135 mAh/g. Accordingly, it was confirmed that the positive electrode obtained through the above-described processes can be charged and discharged in a region of 3 V or more.

(4-3) Manufacture of Power Storage Device of Example 1-1

To evaluate a power storage device, a wound-type cell was prepared. The electrode assembly of the wound-type cell was made by stacking the positive electrode and the negative electrode with the separator interposed therebetween to form a laminate, and by winding the laminate. The separator was made of polyethylene non-woven cloth having a thickness of 35 μm. The prepared electrode assembly was a wound body.

In the electrode assembly, the positive electrode active material layer unformed portion of the positive electrode current collector and the negative electrode active material layer unformed portion of the negative electrode current collector were on the opposite sides in the width direction W. The center of the positive electrode active material layer in the width direction W coincided with the center of the negative electrode active material layer in the width direction W. Consequently, the surplus region A of the negative electrode active material layer had a width of 5 mm at each end in the width direction W.

$LiPF_6$, and was a mixed solvent containing ethylene carbonate, 1-fluoroethyl carbonate, and ethyl methyl carbonate at a volume ratio of 1:2:7. Through these processes, a wound-type cell for evaluation was obtained.

Table 1 shows the composition of the negative electrode active material, the thickness of the negative electrode active material layer, the coating weight of the negative electrode active material layer, the width of the negative electrode active material layer, the effective width EW in the electrolyte solution tank 3, the effective width EW in the electrolyte solution tank 5, the lithium doping ratio in the negative electrode, the material of the positive electrode active material, and the width of the positive electrode active material layer in Example 1-1. LCO in Table 1 means lithium cobalt oxide. LFP in Table 1 means lithium iron phosphate.

TABLE 1

| | | Example 1-1 | Example 1-2 | Example 1-3 | Example 1-4 | Example 1-5 | Example 1-6 |
|---|---|---|---|---|---|---|---|
| Composition of negative electrode active material (mass %) | SiO | 20 | 15 | 100 | — | — | — |
| | Graphite | 80 | 85 | — | — | 100 | — |
| | Hard carbon | — | — | — | 100 | — | 100 |
| thickness of negative electrode active material layer (μm) | | 50 | 45 | 30 | 70 | 130 | 100 |
| Coating weight of negative electrode active material layer (g/m²) | | 85 | 75 | 35 | 80 | 150 | 110 |
| Width of negative electrode active material layer (mm) | | 120 | 120 | 120 | 120 | 120 | 120 |
| Effective Width EW (mm) | Solution tank 3 | 112 | 115 | 118 | 113 | 117 | 115 |
| | Solution tank 5 | 112 | 115 | 118 | 113 | 117 | 99 |
| Lithium doping ratio in negative electrode (%) | | 25 | 20 | 20 | 10 | 90 | 15 |
| Material for positive electrode active material | | LCO | LCO | LCO | LFP | LFP | LFP |
| Width of positive electrode active material layer (mm) | | 110 | 110 | 110 | 110 | 110 | 110 |

| | | Example 1-7 | Comparative Example 1-1 | Comparative Example 1-2 | Comparative Example 1-3 |
|---|---|---|---|---|---|
| Composition of negative electrode active material (mass %) | SiO | — | 15 | 15 | 15 |
| | Graphite | — | 85 | 85 | 85 |
| | Hard carbon | 100 | — | — | — |
| thickness of negative electrode active material layer (μm) | | 105 | 65 | 65 | 65 |
| Coating weight of negative electrode active material layer (g/m²) | | 115 | 100 | 100 | 100 |
| Width of negative electrode active material layer (mm) | | 120 | 120 | 120 | 120 |
| Effective Width EW (mm) | Solution tank 3 | 120 | 110 | 120 | not pass the tank |
| | Solution tank 5 | 105 | 110 | resin plate in center | not pass the tank |
| Lithium doping ratio in negative electrode (%) | | 15 | 20 | 20 (100 in surplus region A) | not doped |
| Material for positive electrode active material | | LFP | LCO | LCO | LCO |
| Width of positive electrode active material layer (mm) | | 110 | 110 | 110 | 110 |

Subsequently, the positive electrode active material layer unformed portion was provided with a current collecting lead portion of the positive electrode by ultrasonic welding. Also, the negative electrode active material layer unformed portion was provided with a current collecting lead portion of the negative electrode by ultrasonic welding. The current collecting lead portion of the positive electrode was connected to a positive electrode terminal on a battery lid. The current collecting lead portion of the negative electrode was connected to a negative electrode terminal on the battery lid.

Then, the battery lid was welded on a battery-can by laser weld. Finally, a required amount of electrolyte solution was injected through a liquid injecting port formed on the battery lid to vacuum-impregnate, and the liquid injecting port was laser welded. The electrolyte solution contained 1.4 M of (4-4) Manufacture of Power Storage Device of Other Examples and Comparative Examples The power storage devices of Examples 1-2 to 1-7, Examples 2-1 to 2-3, and Comparative Examples 1-1 to 1-3 were manufactured in a basically similar manner to the power storage device of Example 1-1. However, the composition of the negative electrode active material, the thickness of the negative electrode active material layer, the coating weight of the negative electrode active material layer, the width of the negative electrode active material layer, the effective width EW in the electrolyte solution tank 3, the effective width EW in the electrolyte solution tank 5, the lithium doping ratio in the negative electrode, the material of the positive electrode active material, and the width of the positive electrode active material layer were set as shown in Table 1 or Table 2.

TABLE 2

|  |  | Example 2-1 | Example 2-2 | Example 2-3 | Comparative Example 2-1 |
|---|---|---|---|---|---|
| Composition of negative electrode active material (mass %) | SiO | 15 | 15 | 15 | 15 |
|  | Graphite | 85 | 85 | 85 | 85 |
| Thickness of negative electrode active material layer (μm) |  | 40 | 40 | 40 | 40 |
| Coating weight of negative electrode active material layer (g/m²) |  | 70 | 70 | 70 | 70 |
| Width of negative electrode active material layer (mm) |  | 120 | 120 | 120 | 120 |
| Effective Width EW (mm) | Solution tank 3 | 92 | 95 | 98 | 89 |
|  | Solution tank 5 | 92 | 95 | 98 | 89 |
| Lithium doping ratio in negative electrode (%) |  | 25 | 25 | 20 | 30 |
| Material for positive electrode active material |  | LCO | LCO | LCO | LCO |
| Width of positive electrode active material layer (mm) |  | 100 | 100 | 100 | 100 |

In Example 1-2, lithium metal plates having a width of 120 mm were used in each of the electrolyte solution tanks 3, 5. The lithium metal plates were covered with the resin plates 97 in the vicinity of the both ends in the width direction W by a width of 2.5 mm each. Consequently, the effective width EW was 115 mm in each of the electrolyte solution tanks 3, 5.

In Example 1-6, a lithium metal plate having a width of 115 mm was used in the electrolyte solution tank 3. The effective width EW in the electrolyte solution tank 3 was 115 mm. In Example 1-6, a lithium metal plate having a width of 99 mm was used in the electrolyte solution tank 5. The effective width EW in the electrolyte solution tank 5 was 99 mm.

In Example 1-7, a lithium metal plate having a width of 120 mm was used in the electrolyte solution tank 3. The effective width EW in the electrolyte solution tank 3 was 120 mm. In Example 1-7, a lithium metal plate having a width of 105 mm was used in the electrolyte solution tank 5. The effective width EW in the electrolyte solution tank 5 was 105 mm.

In Comparative Example 1-2, a lithium metal plate having a width of 120 mm was used in the electrolyte solution tank 3. The effective width EW in the electrolyte solution tank 3 was 120 mm. In Comparative Example 1-2, a lithium metal plate having a width of 120 mm was used in the electrolyte solution tank 5. A resin plate having a width of 110 mm covered a central portion of the lithium metal plate in the electrolyte solution tank 5 except for a range of 5 mm from each end in the width direction W. In Comparative Example 1-2, the electric current value and a conveying speed were adjusted so that the lithium doping ratio of the surplus region A becomes 100% of the discharge capacity and the lithium doping ratio of the center region C becomes 20%.

In Comparative Example 1-3, the electrode precursor 73 was not pre-doped. In Comparative Example 1-3, a power storage device was manufactured using the non-predoped electrode precursor 73 as the power storage device negative electrode 75.

In Examples 2-1 to 2-3, and Comparative Example 2-1, lithium metal plates having a width of 120 mm were used in the electrolyte solution tanks 3, 5.

In Example 1-2, in each of the electrolyte solution tanks 3, 5, the lithium metal plate was covered with the resin plate 97 in the vicinity of the both ends in the width direction W over 14 mm each. Consequently, in Example 2-1, the effective width EW was 92 mm in each of the electrolyte solution tanks 3, 5.

Also in Examples 2-2, 2-3 and Comparative Example 2-1, the resin plate 97 was used to adjust the effective width EW in each of the electrolyte solution tanks 3, 5 as shown in Table 2.

In Examples 1-2, 1-3, Examples 2-1 to 2-3, Comparative Examples 1-1 to 1-3, and Comparative Examples 2-1, lithium cobalt oxide was used for the positive electrode active material. The cyclic voltammetry measurement was performed on these positive electrodes in a similar manner to Example 1-1. The results revealed that in each positive electrode, the area ratio of the reduction current to the oxidation current was 0.99 and the capacity calculated from the area of the reduction current was 135 mAh/g.

In Examples 1-4 to 1-7, lithium iron phosphate was used as the positive electrode active material. The cyclic voltammetry measurement by use of the tripolar cell was also performed on these positive electrodes in a similar manner to Example 1-1 except that the voltage range was 3.0 V to 4.0 V. The results revealed that in every positive electrode, the area ratio of the reduction current to the oxidation current was 0.99 and the capacity calculated from the area of the reduction current was 160 mAh/g.

(4-5) Method for Evaluating Power Storage Device (Except for Examples 1-4 to 1-7)

The power storage devices of Examples 1-1 to 1-3, Examples 2-1 to 2-3, Comparative Examples 1-1 to 1-3, and Comparative Examples 2-1 were evaluated in terms of an initial discharge capacity, a negative electrode potential after short-circuited, a negative electrode discharge capacity in a charged state, a fraction defective after 25° C. 5 C cycle, and a capacity retention rate after 60° C. 1 C cycle. The evaluation method will be described below.

Evaluation of Initial Discharge Capacity

The power storage device was charged with a constant current of 1 A until a cell voltage becomes 4.3 V. Then, a constant-current and constant-voltage charge in which a constant voltage of 4.3 V is applied was carried out for 30 minutes. Then, the power storage device was discharged with a constant current of 1 A until the cell voltage becomes 2.0 V. A cycle test to repeat the above cycle was conducted, and a discharge capacity in the second discharging was measured. This measured value was used for an initial discharge capacity.

Negative Electrode Potential After Short-Circuited

The power storage device after the evaluation of the initial discharge capacity was discharged with a constant current in a charge/discharge tester for at least 12 hours or more until the voltage becomes 0 V. Then, the power storage device is left for at least 12 hours while the positive electrode terminal and the negative electrode terminal were electricity short-circuited. Subsequently, the short-circuited state was released. The power storage device was then disassembled to take a sample from each of the surplus region A, the end region B, and the center region C. Within 0.5 to 1.5 hours after the short-circuited state was released, measurements were made of the negative electrode potential VA of the surplus region A, the negative electrode potential VB of the end region B, and the negative electrode potential VC of the center region C.

Negative Electrode Discharge Capacity in Charged State

The power storage device after the evaluation of the initial discharge capacity was charged with a constant current of 1 A in the charge/discharge tester until the cell voltage becomes 4.3 V. Then, the power storage device underwent a constant-current and constant-voltage charge in which a constant voltage of 4.3 V is applied, for 30 minutes. Then, the power storage device was disassembled to take a sample from each of the surplus region A, the end region B, and the center region C. Subsequently, measurements were made of the negative electrode discharge capacity QA of the surplus region A, the negative electrode discharge capacity QB of the end region B, and the negative electrode discharge capacity QC of the center region C. Furthermore, QA/QB, QA/QC, and QB/QC were calculated.

Fraction Defective After 25° C. 5 C Cycle

Ten power storage devices after the evaluation of the initial discharge capacity were prepared, and each initial discharge capacity was measured. Then, a cycle test was conducted on each of the ten power storage devices in an atmosphere of 25° C. In the cycle test, a cycle basically the same as that of the initial discharge capacity measurement was repeated 100 times. However, in the cycle test, the charge and discharge of the constant current was carried out with an electric current value equivalent to 5 C. The electric current value of 5 C means an electric current capable of discharging the initial discharge capacity in ⅕ hours.

Subsequently, the ten power storage devices were each disassembled. If lithium metal is precipitated on the surface of the negative electrode, such power storage device was determined as defective. A calculation was made to obtain a ratio of the number of defective power storage devices to the ten power storage devices (hereinafter, referred to as fraction defective after 25° C. 5 C cycle).

Capacity Retention Rate After 60° C. 1 C Cycle

The initial discharge capacity of the power storage device was measured. Then, a cycle test was conducted on the power storage device in an atmosphere of 60° C. In the cycle test, a cycle basically the same as that of the initial discharge capacity measurement was repeated 100 times. However, in the cycle test, the charge and discharge of constant current was carried out with an electric current value equivalent to 1 C. The electric current value of 1 C means an electric current capable of discharging the initial discharge capacity in one hour.

Subsequently, the power storage device was cooled to room temperature. Then, a discharge capacity after 100 cycles was measured in a similar manner to the method for measuring the initial discharge capacity. A calculation was made to obtain a ratio of the discharge capacity after 100 cycles to the initial discharge capacity (hereinafter, referred to as capacity retention rate after 60° C. 1 C cycle).

(4-6) Method for Evaluating Power Storage Devices of Examples 1-4 to 1-7

The power storage devices of Examples 1-4 to 1-7 were evaluated in a basically similar manner to the evaluation method of Example 1-1 or the like. However, in the evaluations of the power storage devices of Examples 1-4 to 1-7, an upper limit of voltage to charge the power storage device was 4.0 V when evaluating the initial discharge capacity, the discharge capacity in the charged state, the fraction defective after 25° C. 5 C cycle, and capacity retention rate after 60° C. 1 C cycle.

(4-7) Evaluation Results of Power Storage Devices

Table 3 shows the evaluation results of Examples 1-1 to 1-7, and Comparative Examples 1-1 to 1-3. Table 4 shows the evaluation results of Examples 2-1 to 2-3 and Comparative Example 2-1.

TABLE 3

| | | Example 1-1 | Example 1-2 | Example 1-3 | Example 1-4 | Example 1-5 | Example 1-6 |
|---|---|---|---|---|---|---|---|
| Conditions | Upper limit of voltage while charging | 4.3 V | 4.3 V | 4.3 V | 4.0 V | 4.0 V | 4.0 V |
| Negative electrode potential after short-circuited | VA | 1.5 | 1.1 | 0.6 | 1 | 0.15 | 0.9 |
| | VB | 0.7 | 0.9 | 0.8 | 0.8 | 0.1 | 0.9 |
| | VC | 0.7 | 0.8 | 0.8 | 0.7 | 0.1 | 0.7 |
| | VA/VC | 2.14 | 1.38 | 0.75 | 1.43 | 1.5 | 1.29 |
| Negative electrode discharge capacity in charged state | QA/QB | 0.002 | 0.004 | 0.021 | 0.003 | 0.641 | 0.006 |
| | QA/QC | 0.002 | 0.004 | 0.021 | 0.003 | 0.641 | 0.006 |
| | QB/QC | 1 | 1 | 1 | 1 | 1 | 0.901 |
| Fraction defective after 25° C. 5 C cycle | | 30% | 40% | 50% | 20% | 60% | 0% |
| Capacity retention rate after 60° C. 1 C cycle | | 64% | 70% | 62% | 65% | 81% | 84% |

TABLE 3-continued

|  |  | Example 1-7 | Comparative Example 1-1 | Comparative Example 1-2 | Comparative Example 1-3 |
|---|---|---|---|---|---|
| Conditions | Upper limit of voltage while charging | 4.0 V | 4.3 V | 4.3 V | 4.3 V |
| Negative electrode potential after short-circuited | VA | 0.6 | 2.8 | 0.1 | 2.9 |
|  | VB | 0.7 | 0.8 | 0.7 | 1.1 |
|  | VC | 0.6 | 0.7 | 0.7 | 1.2 |
|  | VA/VC | 1 | 4 | 0.14 | 2.42 |
| Negative electrode discharge capacity in charged state | QA/QB | 0.014 | 0 | 1 | 0 |
|  | QA/QC | 0.015 | 0 | 1 | 0 |
|  | QB/QC | 0.963 | 1 | 1 | 1 |
| Fraction defective after 25° C. 5 C cycle |  | 10% | 40% | 90% | 100% |
| Capacity retention rate after 60° C. 1 C cycle |  | 77% | 34% | 69% | 18% |

TABLE 4

|  |  | Example 2-1 | Example 2-2 | Example 2-3 | Comparative Example 2-1 |
|---|---|---|---|---|---|
| Conditions | Upper limit of voltage while charging | 4.3 V | 4.3 V | 4.3 V | 4.3 V |
| Negative electrode discharge capacity in charged state | QA/QB | 0 | 0 | 0 | 0 |
|  | QB/QC | 0.75 | 0.05 | 0.95 | 0.66 |
| Fraction defective after 25° C. 5 C cycle |  | 10% | 0% | 10% | 70% |

5. OTHER EMBODIMENTS

Although embodiments of the present disclosure have been described above, the present disclosure is not limited to the above-described embodiments, but can be implemented in variously modified forms.

(1) Functions of one component in each of the above-described embodiments may be distributed to two or more components; a function of two or more components may be achieved by one component. One part of the configuration of each of the above-described embodiments may be omitted. At least a part of the configuration of each of the above-described embodiments may be added to or replaced with the configurations of other embodiments described above.

(2) In addition to the above-described power storage device, the present disclosure can be implemented in various forms, such as a system comprising the power storage device as a constituent element.

The invention claimed is:

1. A power storage device, comprising:
an electrode assembly comprising a positive electrode, a separator, and a negative electrode; and
an electrolyte solution,
wherein the negative electrode is doped with lithium,
wherein the negative electrode comprises a negative electrode current collector and a negative electrode active material layer formed on a surface of the negative electrode current collector,
wherein the positive electrode comprises a positive electrode current collector and a positive electrode active material layer formed on a surface of the positive electrode current collector,
wherein a lithium doping ratio is in a range of from 5 to 95%, relative to a discharge capacity of the negative electrode, the lithium doping ratio being an amount of the lithium doped in the negative electrode active material layer relative to the discharge capacity of the negative electrode,
wherein the negative electrode active material layer comprises
surplus regions A, located at both ends in a width direction of the negative electrode active material layer,
end regions B, adjacent to the surplus regions A and located closer, than the surplus regions A, to a center in the width direction of the negative electrode active material layer, and
a center region C, other than both the surplus region A and the end region B,
wherein the surplus regions A do not face the positive electrode active material layer,
wherein the end regions B face a positive electrode end region of the positive electrode active material layer, the positive electrode end region being a region extending from an end toward a center in a width direction of the positive electrode active material layer by a length of 5% of a length from the center to the end, and
wherein, in a case where the power storage device is disassembled in a charged state and a discharge capacity QA in mAh/g of each of the surplus regions A and a discharge capacity QC in mAh/g of the center region C are measured, Formula (4) is satisfied:

$$0 < QA < QC \qquad (4).$$

2. The device of claim 1, wherein the negative electrode comprises SiO.

3. The device of claim 1, wherein the negative electrode comprises graphite.

4. The device of claim 1, wherein the negative electrode comprises SiO and graphite.

5. The device of claim 1, wherein a coating weight of the negative electrode active material layer is in a range of from 35 to 150 g/m$^2$.

6. The device of claim 1, wherein the negative electrode active material layer has a thickness in a range of from 30 to 130 μm.

7. The device of claim 1, further satisfying Formula (5):

$$0.001 \leq QA/QC \leq 0.8 \qquad (5).$$

8. The device of claim 7, wherein, in the case where the power storage device is disassembled in the charged state and a discharge capacity QB in mAh/g of the each of the end regions B is further measured in addition to the discharge capacity QA in mAh/g and the discharge capacity QC in mAh/g, Formula (6) is further satisfied:

$$0.001 \leq QA/QB \leq 0.8 \tag{6}$$

9. The device of claim 8, further satisfying Formula (7):

$$0.7 \leq QB/QC \leq 0.99 \tag{7}$$

* * * * *